US010055139B1

(12) United States Patent
Bent et al.

(10) Patent No.: US 10,055,139 B1
(45) Date of Patent: Aug. 21, 2018

(54) OPTIMIZED LAYOUT IN A TWO TIER STORAGE

(71) Applicant: EMC Corporation, Hopkinton, MA (US)

(72) Inventors: John M. Bent, Los Alamos, NM (US); Sorin Faibish, Newton, MA (US); James M. Pedone, Jr., West Boylston, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 73 days.

(21) Appl. No.: 15/086,946

(22) Filed: Mar. 31, 2016

(51) Int. Cl.
*G06F 12/02* (2006.01)
*G06F 3/06* (2006.01)

(52) U.S. Cl.
CPC .......... *G06F 3/0611* (2013.01); *G06F 3/0647* (2013.01); *G06F 3/0683* (2013.01)

(58) Field of Classification Search
CPC .... G06F 3/0608; G06F 3/0644; G06F 3/0689; G06F 3/064; G06F 3/0643; G06F 3/0652
See application file for complete search history.

(56) References Cited

U.S. PATENT DOCUMENTS

2002/0073285 A1\* 6/2002 Butterworth .......... G06F 3/0608
711/154
2008/0263282 A1\* 10/2008 Harada ............... G06F 12/0804
711/129

\* cited by examiner

*Primary Examiner* — Yong Choe
(74) *Attorney, Agent, or Firm* — Krishnendu Gupta; Konrad R. Lee

(57) ABSTRACT

A system, computer program product, and computer-executable method including presenting, to an application, data storage from a data storage system including a fast tier (FT) of data storage and a capacity tier (CT) of data storage, wherein the data storage system is enabled augment data stored within the data storage system to facilitate moving data between tiers of data storage within the data storage system, analyzing data stored on the FT of the data storage system to determine whether the application is sending write I/Os associated with the data, upon a negative determination, augmenting the data for the CT, and moving the data to the CT.

21 Claims, 18 Drawing Sheets

IMPORTING A DLN INTO THE FT

OPENING A NEW FILE FOR WRITING

WRITING TO A FILE

FLUSHING DIRTY DATA

OPEN ATTEMPT ON NON-EXISTENT FILE

READ OPEN OF A FILE RESIDENT IN THE FT

READ OPEN OF A FILE ON THE CT ONLY

READING A FILE THROUGH THE 2T INTERFACE

FREEING FT CAPACITY BY EVICTING DATA

FREEING FT CAPACITY BY EVICTING 2T METADATA

US 10,055,139 B1

OPTIMIZED LAYOUT IN A TWO TIER STORAGE

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

A system, computer program product, and computer-executable method including presenting, to an application, data storage from a data storage system including a fast tier (FT) of data storage and a capacity tier (CT) of data storage, wherein the data storage system is enabled augment data stored within the data storage system to facilitate moving data between tiers of data storage within the data storage system, analyzing data stored on the FT of the data storage system to determine whether the application is sending write I/Os associated with the data, upon a negative determination, augmenting the data for the CT, and moving the data to the CT.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

Like reference symbols in the various drawings indicate like elements.

DETAILED DESCRIPTION

Figure 1:
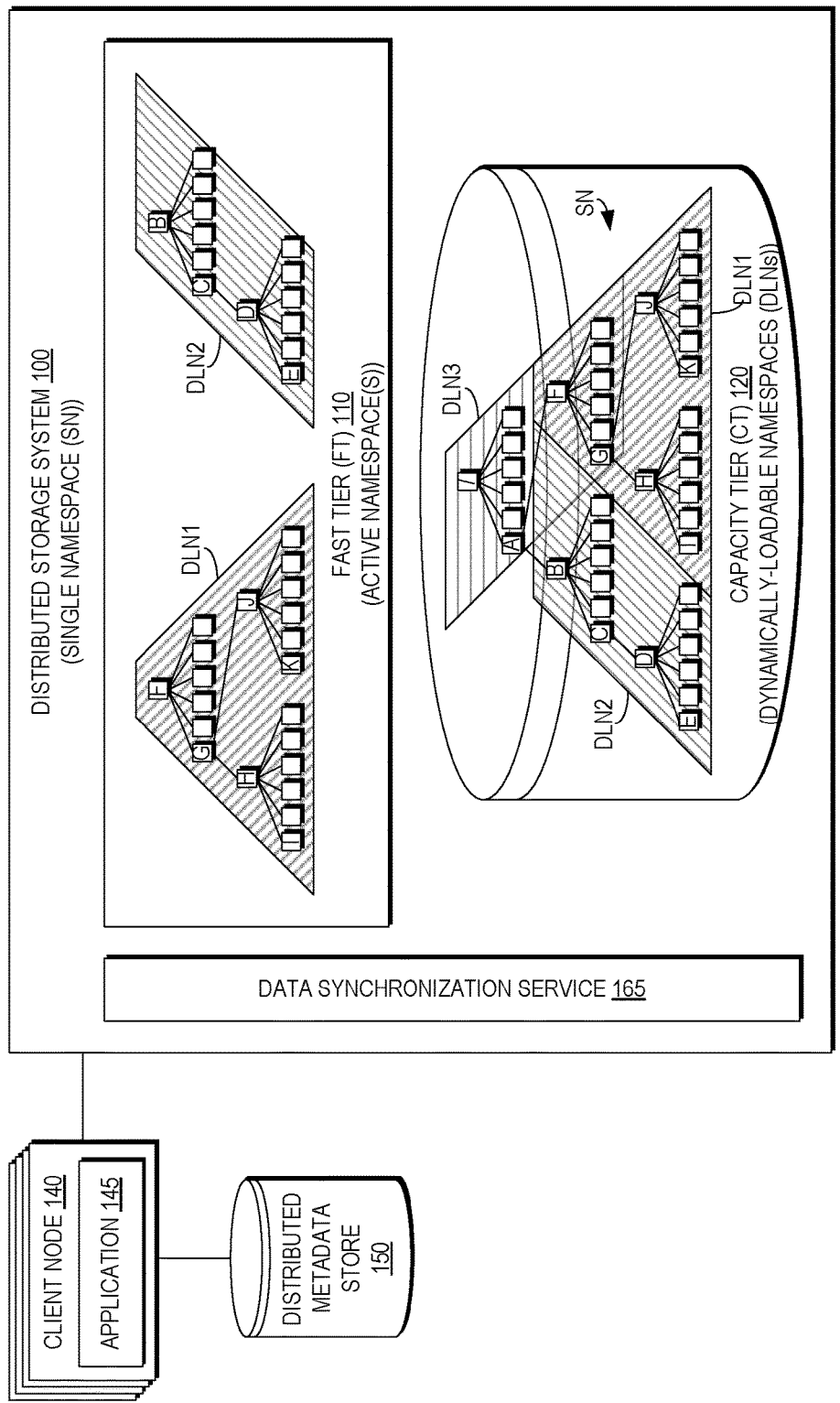
FIGS. 1 and 2 are block diagrams of a two-tier distributed storage system having a single namespace comprised of a plurality of dynamically-loadable namespaces according to respective example embodiments of the present invention.

Typically, data storage systems are optimized for write performance using various techniques such as log-structured data layouts and small file packing. Generally, log-structured data layouts improve write performance for random writes and small file packing improves write performance for metadata bottlenecks formed from too many small file creates. Typically, unfortunately, these techniques then decrease read performance for most typical read workloads. Conventionally, improvements to data storage system I/O performance would be beneficial to the data storage industry.

In many embodiments, the current disclosure may enable a data storage system to improve read and write performance within the data storage system. In various embodiments, the current disclosure may leverage tiering capabilities within a two tiered data storage system. In certain embodiments, the current disclosure may enable a two tiered data storage system to use write-optimized data layouts for newly written data. In other embodiments, the current disclosure may enable a two tiered data storage system to "piggy-back" on an existing data tiering system to reorganize the data into read-optimized layouts.

Two-Tier Storage Architecture

Object-scale storage systems may be billions if not trillions of objects. Further, while file system interfaces are ubiquitous and present greater usability, one of ordinary skill in the art will appreciate that limitations in file systems (e.g., Lustre, GPFS), such as a limited set of inodes, render traditional file system interfaces inoperable for accessing trillion-scale object stores. While objects stores excel as a capacity storage solution, they are not as usable or familiar to users as file system interfaces. Further, although most users only care about data, a common bottleneck in storage systems is often metadata which is directly related to the number of entries in the storage system. Accordingly, it would be advantageous to be able to present a file system interface on top of, for example, a trillion-scale object store to provided added usability but with the scalability of object stores but without the bottleneck of an overwhelming amount of metadata (either in terms of performance or capacity required to store the metadata).

Accordingly, example embodiments of the present invention layers a file system over an object store. As will be described in greater detail below, the file system may have a global single namespace (SN) comprising a plurality of dynamically-loadable namespaces (DLNs) maintained in the capacity tier of object storage in the distributed storage system. In response to a job submitted by an application on a client node, the distributed storage system may dynamically load a particular dynamically-loadable namespace, including metadata only for that dynamically-loadable namespace, associated with the job from the capacity tier of object storage into the fast tier of storage for the storage system. Therefore, only a dynamic subset of the data in the capacity tier has metadata in the acceleration tier.

FIG. 1 is a block diagrams of a two-tier distributed storage system 100 having a single namespace (SN) comprised of a plurality of dynamically-loadable namespaces (DLNs) DLN1, DLN2, DLN3 according to an example embodiment of the present invention. It should be understood that, among other benefits, retaining a single namespace allows unmodified applications to run anywhere without any required knowledge about data locality. As illustrated in FIG. 1, the two-tier distributed storage system 100 comprises a first performance (fast) tier (FT) 110 that employs memory based on performance considerations (e.g., access times) and a second capacity tier (CT) 120 that employs storage based on capacity considerations. In this manner, the two-tier distributed storage system 100 balances between the relative costs of memory and other storage and their relative speeds. It is to be appreciated that more than two storage tiers 110, 120 may be used in other embodiments. As will be described in greater detail below, the distributed storage system 100 may be accessed by client nodes 140 running client applications 145 relying on a distributed metadata storage 150 to identify nodes of the distributed storage system 100 responsible for respective files of the single namespace.

The distributed storage system 100 may have a global single namespace (SN) comprised of a plurality of dynamically-loadable namespaces (DLNs) maintained in the capacity tier 120 with one or more active namespaces loaded into the fast tier 110. The distributed storage system 100 also may include a data synchronization service 130 configured to copy the data from the fast tier 110 to the disk-based object storage in the capacity tier (CT) 120 to free the data from, for example, the flash storage in the performance tier 110 when additional capacity in the performance tier 110 is required.

As illustrated in FIG. 1, the capacity tier 120 may store objects storing the plurality of dynamically-loadable namespaces (DLNs) comprising the single namespace (SN). For example, the single namespace may describe the file system shown in FIG. 1 with a root (/) and directories A, B, C, D, E, F, G, H, I, J, and K. According to an example embodiment of the present invention, however, the single namespace may be partitioned into a plurality of dynamically-loadable namespaces: DLN1 may describe directories F, G, H, I, J, and K; DLN2 may describe directories B, C, D, and E; and DLN3 may describe the root (/), A, F, and G directories. While a dynamically-loadable namespace is on the fast tier 110, it's a namespace; while a dynamically-loadable namespace is the capacity tier 120, it's just an object identifier (OID).

To ensure that all jobs on the system can see the entire system as they would expect when run on a monolithic system, the DLNs of different jobs can overlap. In other words, it should be understood that respective portions of the single namespace may reside in a plurality of dynamically-loadable namespaces (e.g., directories F and G are in both DLN1 and DLN3). This means that loading a DLN into the FT 110 requires that it be visible across the entire FT 110; presumably this implies that the DLN be distributed across the complete set of data nodes (e.g., not just the set of data nodes servicing that job) as will be described in greater detail below with respect to FIG. 2.

The exemplary performance (fast) tier (FT) 110 comprises flash memory, such as a DSSD™ flash storage system, commercially available from EMC Corporation of Hopkinton, Mass., or other high-speed memory having a substantially lower access time than the capacity tier (CT) 120. Although flash memory will often be used, other types of low-latency memory could be used instead of flash memory. Typically, such low-latency memories comprise electronic memories, which may be implemented using non-volatile memories, volatile memories, or combinations of non-volatile and volatile memories.

The exemplary capacity tier (CT) 120 may be implemented, for example, using a Distributed Application Object Storage (DAOS) Object Store, proposed by Intel Corporation; a multi disk storage tier, such as an Isilon® storage array, commercially available from EMC Corporation of Hopkinton, Mass.; or ViPR®, a Software-Defined Storage product commercially available from EMC Corporation of Hopkinton, Mass. that abstracts storage from disparate arrays into a single pool of storage capacity.

While example embodiments of the present invention are illustrated herein using multiple storage tiers comprised of a plurality of exemplary storage technologies, such as flash storage, other storage technologies can be employed in each tier, as would be apparent to a person of ordinary skill in the art. In addition, while example embodiments of the present invention are illustrated herein using multiple storage tiers to store, for example, a checkpoint, as noted above, example embodiments of the present invention also apply to the storage of other data, such as other bursty IO tasks, as would be apparent to a person of ordinary skill in the art.

Example embodiments of the present invention are described herein with reference to an exemplary MapReduce compute architecture and associated compute nodes, storage systems, applications and other processing devices. It is to be appreciated, however, that the invention is not restricted to use with the particular illustrative MapReduce architecture and device configurations shown. Accordingly, the terms "job scheduler" and "job tracker" as used herein are intended to be broadly construed, so as to encompass, for example, other job scheduling entities in a batch system, a distributed resource management system (DRMS), or a distributed resource manager (DRM), as would be apparent to a person of ordinary skill in the art. Likewise, the term "data node" as used herein is intended to be broadly construed, so as to encompass, for example, other storage nodes in a job scheduling system, a batch system, a distributed resource management system (DRMS), or a distributed resource manager (DRM).

Figure 2:
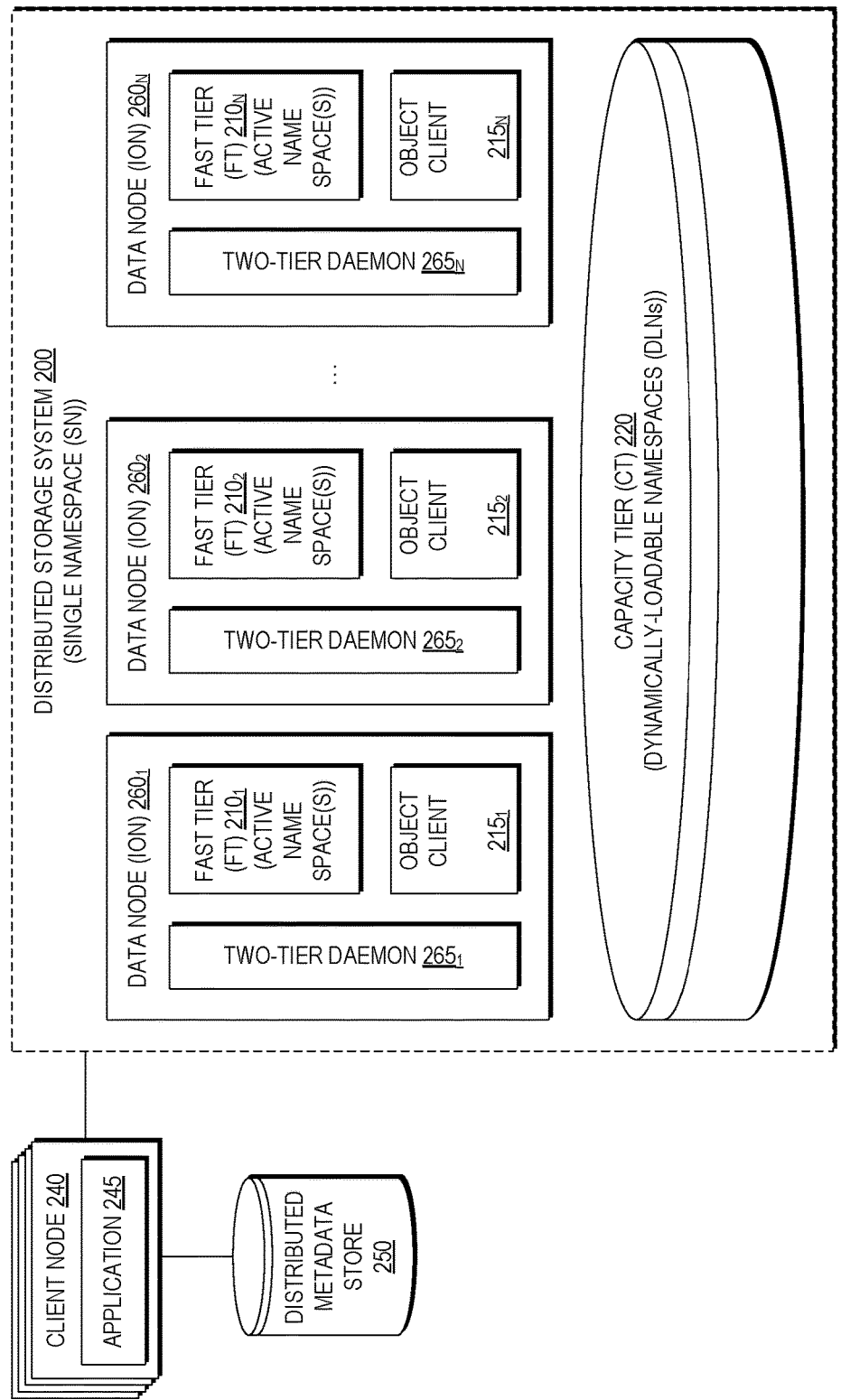

It should be understood that, in certain example embodiments, the architecture illustrated in FIG. 1 may be a Hadoop architecture comprising a name node (which may provide the single namespace (SN) for the two-tier distributed storage system 100), a job tracker, and a Hadoop Distributed File System (HDFS) comprised of a plurality of data nodes (data nodes 260 of FIG. 2). Generally, the exemplary job tracker communicates with the name node to determine the location of data, in a known manner. In addition, the exemplary job tracker optionally assigns each job to a particular data node 130. When the work is complete, the job tracker optionally updates status information. For a more detailed discussion of conventional aspects of the exemplary Hadoop architecture, see, for example, Ovum IT Information Management, "Enterprise-Grade Hadoop: The Building Blocks," (Sep. 24, 2014), incorporated herein by reference in its entirety.

The exemplary name node may maintain the directory tree of all files in the file system, in a known manner, and track where file data is kept across the plurality of data nodes. Client applications 145 operating on client nodes 140 communicate with the name node, for example, when they need to locate a file, or when they want to add, copy, move or delete a file, in a known manner. The name node responds to file requests by returning a list of relevant data nodes where the data is located.

FIG. 2 is a block diagram of a two-tier distributed storage system 200 having a single namespace comprised of a plurality of dynamically-loadable namespaces according to an example embodiment of the present invention. As illustrated in FIG. 2, the distributed storage system 200 may include a plurality of data nodes $260_{1-N}$ (260 generally), with each exemplary data node 260 comprising a first performance (fast) storage tier (FT) $210_{1-N}$ (210 generally) and a second capacity storage tier (CT), accessed via a client $215_{1-N}$ (215 generally) discussed further below.

The client nodes 240 may rely on a distributed metadata storage 250 to match jobs with dynamically-loadable namespaces. For example, when a client node 240 schedules a job, the job scheduler will have a specific name for the task. This job name may be used as an index into a table stored in the distribute metadata store 250 to determine an object identifier (OID) of a dynamically-loadable namespace (DLN) to be loaded into the fast tier 210 for processing of the job. Inside the OID may be a tree of namespace for population into the fast tier 210. When the job is finished, the files in the dynamically-loadable namespace are moved to objects, replace the file with an OID. As will be described in greater detail below, the directory namespace metadata also may be compressed and stored as an object with an OID matching the index table. To ensure that only a dynamically-loadable namespace (i.e., subset, or subtree, of the global metadata) resides in the fast tier 210 at any one time, the distributed storage system 200 must know which DLNs are required or desirable at any one time. Accordingly, in example embodiments of the present invention, a user may specify a DLN (i.e., subtree) when submitting a job to the scheduler.

As illustrated in FIG. 2, each exemplary data node 260 also comprises a two-tier (2T) daemon $265_{1-N}$ (265 generally) that intercepts read and write operations (i.e., I/Os) from applications 245. According to one aspect of the invention, as will be described in greater detail below, the exemplary two-tier daemons 265 store newly written data synchronously into the fast tier (FT) 210 so that the clients nodes 240 see low latency, high performance write operations. In addition, the exemplary two-tier daemons 265 optionally asynchronously copy the data from the fast tier 210 to the disk-based storage in the capacity tier (CT) 220 to free the data from, for example, the flash storage in the performance tier 210 when additional capacity in the performance tier 210 is required. It should be understood that a plurality of data nodes 260 may share a flash storage system, such as a flash-based DSSD storage system.

As indicated above, one or more data nodes 260 of FIG. 2 comprises a performance storage tier 210 and a capacity storage tier 220 accessed via respective object clients $215_{1-N}$ (215 generally). It is to be appreciated, however, that more than two storage tiers may be used in one or more exemplary data nodes 260 in other embodiments. The exemplary performance storage tier 210 and capacity storage tier 220 comprise respective disjoint subsets of storage. The performance storage tier 210 and capacity storage tier 220 in this embodiment comprise different types of storage devices having different performance characteristics. In the present embodiment, the exemplary performance storage tier 210 comprises flash storage devices and the exemplary and capacity storage tier 220 comprises one or more disk-based object storage devices.

The flash storage devices of the performance storage tier 210 are generally significantly faster in terms of read and write access times than the disk storage devices of the capacity storage tier 220. The flash storage devices are therefore considered "fast" devices in this embodiment relative to the "slow" disk storage devices. Accordingly, the exemplary architecture may be characterized in the present embodiment as having a "fast" storage tier 210 and a "slow" storage tier 220, where "fast" and "slow" in this context are relative terms and not intended to denote any particular absolute performance level. However, numerous alternative tiering arrangements may be used, including three or more tiers each providing a different level of performance. The particular storage devices used in a given storage tier may be varied in other embodiments and multiple distinct storage device types may be used within a single storage tier.

The flash storage devices of the performance storage tier 210 generally provide higher performance than the disk storage devices of the capacity storage tier 220 but the disk storage devices of the capacity storage tier 220 generally provide higher capacity at lower cost than the flash storage devices of the performance storage tier 210. The exemplary tiering arrangement of the exemplary data nodes 260 in FIG. 2 therefore makes it possible to dynamically balance the conflicting requirements of storage capacity and IO throughput, thereby avoiding situations in which either performance is less than optimal or the costs of implementing the system become excessive. Arrangements of this type can provide further acceleration of IO operations in the architecture, leading to enhanced system performance relative to conventional arrangements, while additionally or alternatively providing an ability to achieve particular levels of performance at lower cost.

It should be understood that, in a preferred embodiment, I/O from the client nodes 240 is balanced across the set of data nodes 260. For example, each application 245 running on a client node 240 may write to only a single data node 260. This will further improve performance by reducing the number of network connections and network transfers. Balancing reads can be done similarly by spreading data across the distributed storage system 200 and replicate hot spots when useful. By distributing namespace responsibility across the fast tier 210, metadata accesses are similarly balanced. In certain embodiments, mapping files to data nodes 260 (and their respective two-tier daemons 265) can be done with, for example, hashing algorithms or with a second layer of metadata indirection with hashing being preferred as it reduces the number of network round-trips between the client node 240 and the data node 260.

Figure 3:
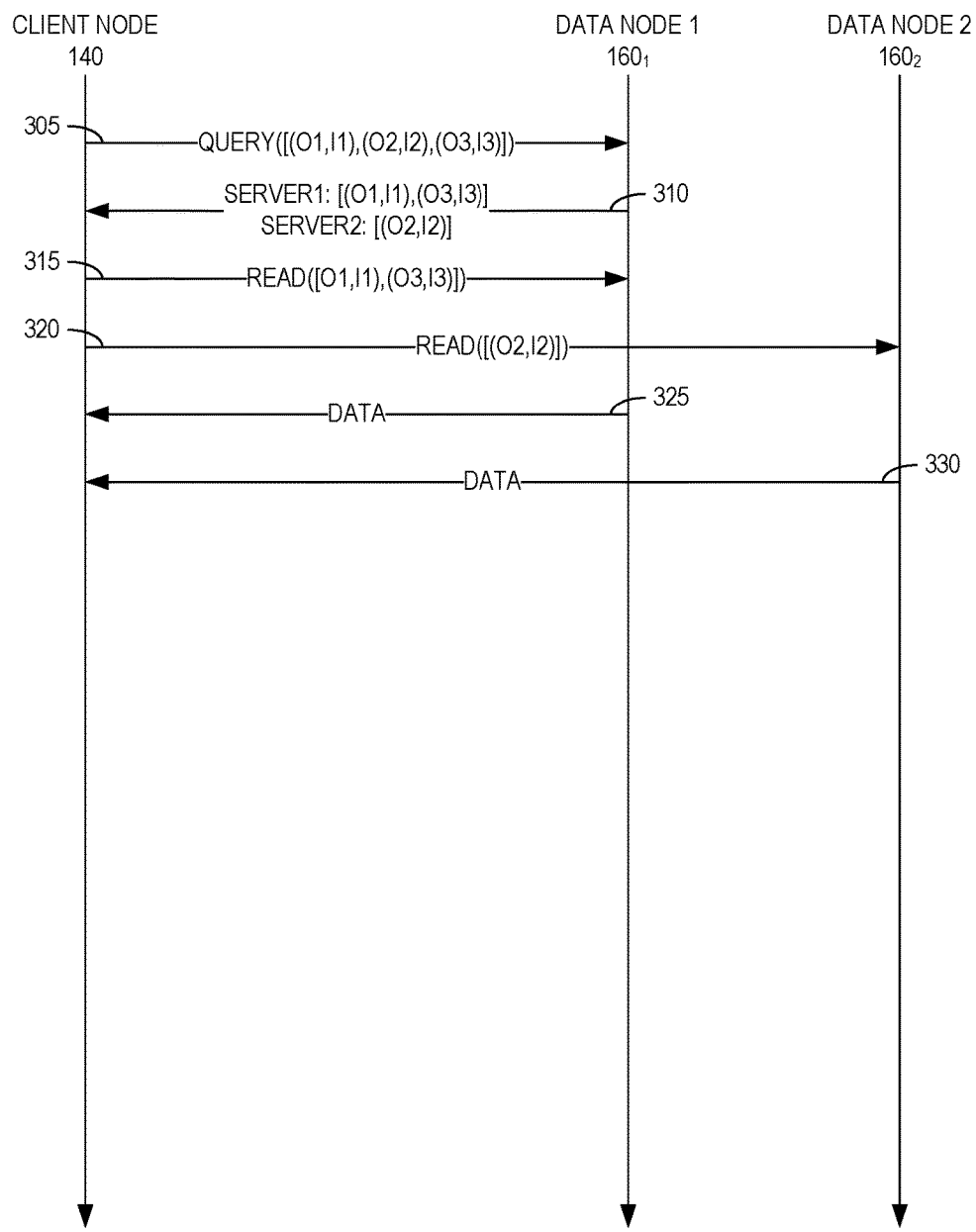
FIG. 3 is a state diagram illustrating a method for reading data in a two-tier distributed storage system according to an example embodiment of the present invention.

FIG. 3 is a state diagram illustrating a method including a redirect mechanism for reading data in a two-tier distributed storage system according to an example embodiment of the present invention and may be described with reference to FIG. 2. When a client node 140 reads, it will request (i.e., query) metadata 305 from a data node 160 and, in response to the metadata identifying data locations 310, direct its read I/O 315, 320 to data nodes $160_1$, $160_2$ on which the target data resides. The data nodes 160 then return data 325, 330 to the client node 140. By synchronously serializing metadata access, the data nodes 160 ensure both that readers see the most recent data and, as will be described in greater detail below, ensuring that overwrites are applied in the correct order. This mechanism binds both processes within a single job as well as processes across multiple jobs into the shared namespace ensuring that cross-job reads and writes work the same as if they were run on a monolithic traditional single tiered system.

Figure 4:
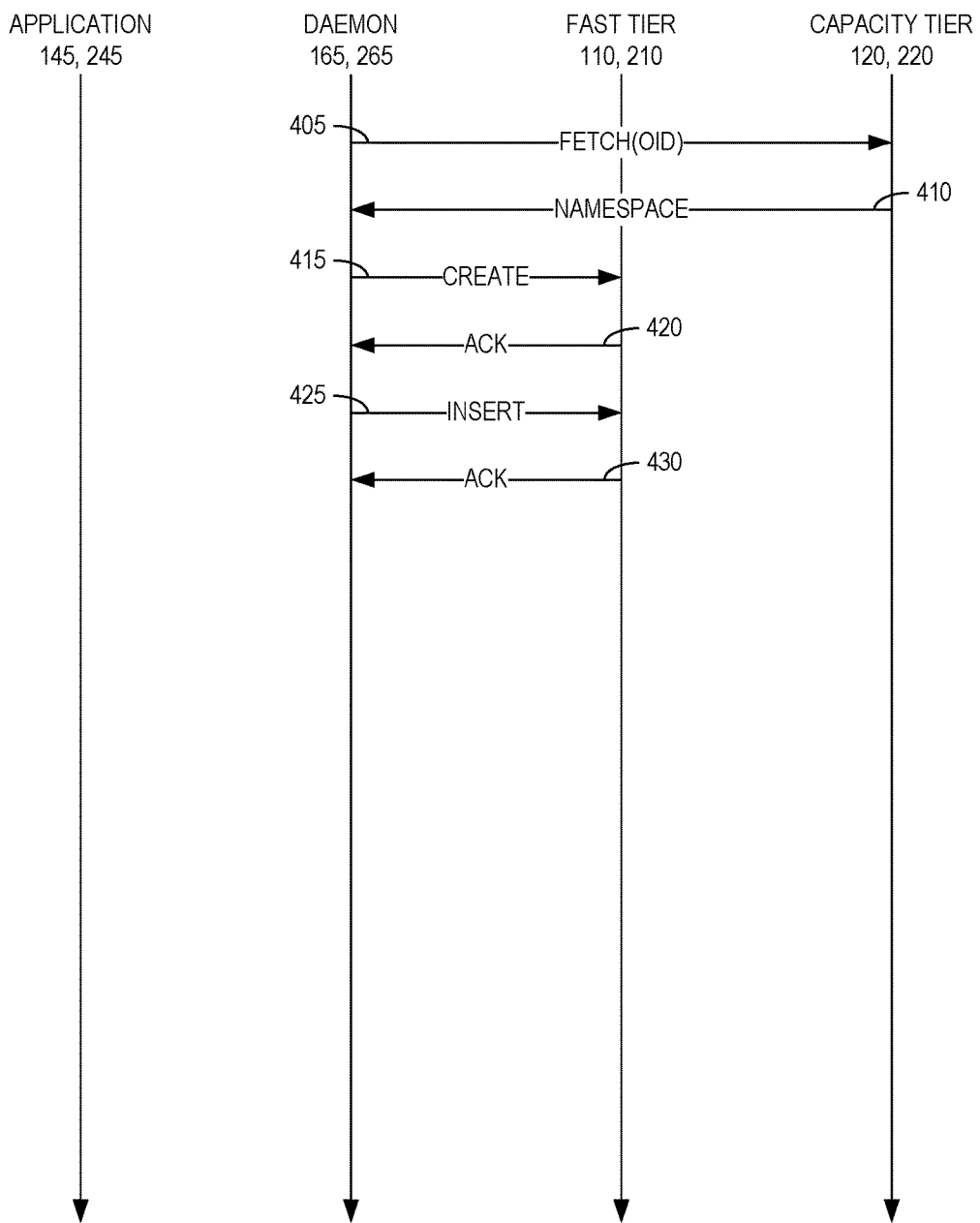
FIG. 4 is a state diagram illustrating a method for importing a dynamically-loadable namespace into a fast tier of a two-tier distributed storage system according to an example embodiment of the present invention.

FIG. 4 is a state diagram illustrating a method for importing a dynamically-loadable namespace (DLN) into a fast tier 110, 210 of a two-tier distributed storage system 100, 200 according to an example embodiment of the present invention. As illustrated in FIG. 4, the two-tier daemon 265 fetches the DLN from the capacity tier 220 by OID (405). The capacity tier 220 then returns the requested DLN (410). The two-tier daemon 265 then creates an initial entry into the fast tier 110, 210 namespace (415), receives a first acknowledgement from the fast tier (420), inserts the DLN into the namespace in the fast tier 110 by populating the namespace with the objects representing the files of the namespace (425), and receives a second acknowledgement from the fast tier (430).

Figure 5:
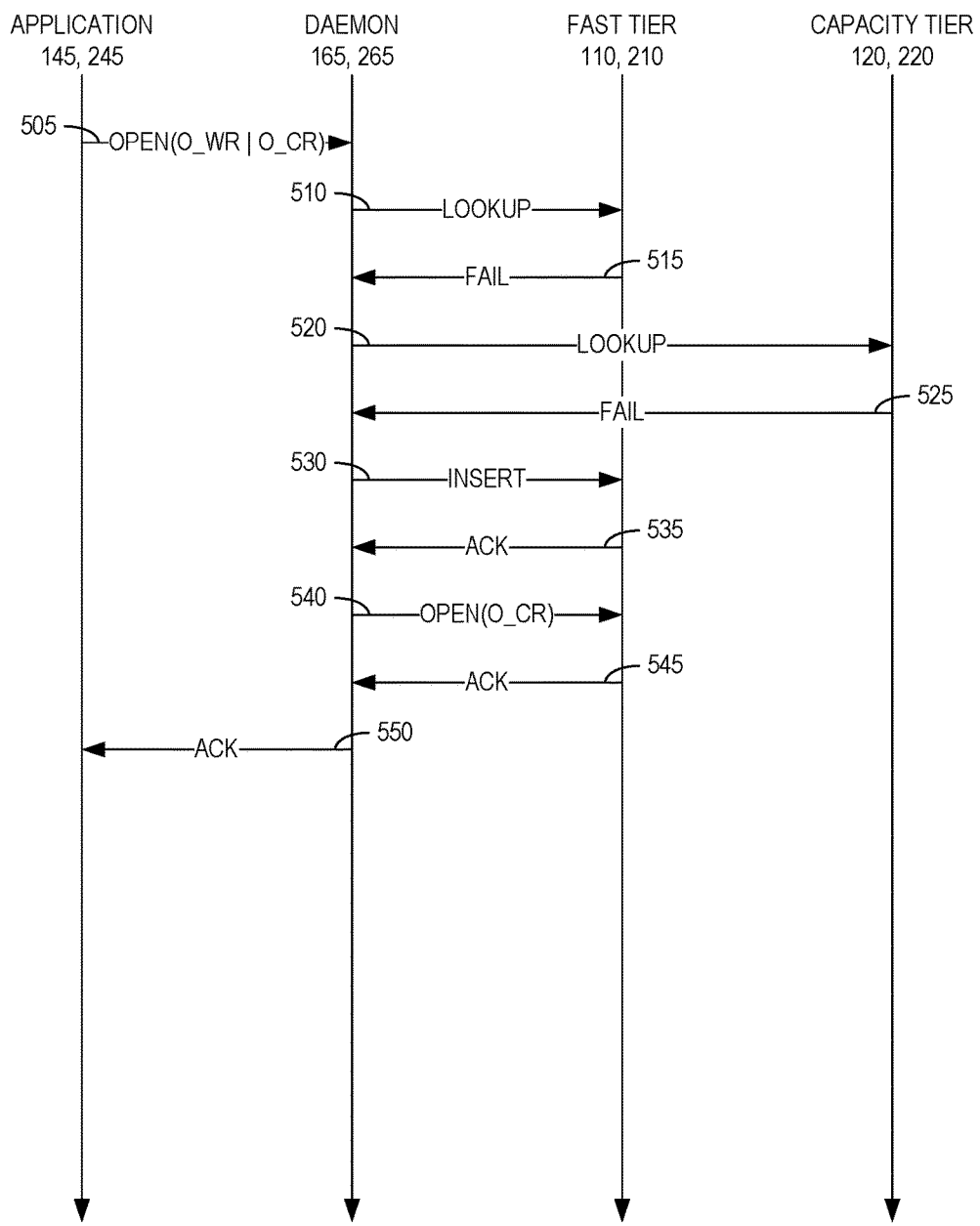
FIG. 5 is a state diagram illustrating a method for opening a new file for writing in a two-tier distributed storage system according to an example embodiment of the present invention.

FIG. 5 is a state diagram illustrating a method for opening a new file for writing in a two-tier distributed storage system 100, 200 according to an example embodiment of the present invention. As illustrated in FIG. 5, the application 145, 245 attempts to open a file for writing (O_WR) (505), requesting that the file system create the file it if does not already exist (O_CR). The two-tier daemon 265 then performs a first lookup for the file determine whether the file is in the fast tier 110, 210 (510). In certain embodiments, the first lookup may fail (515) (e.g., if the file is not in the active dynamically-loadable namespace). The two-tier daemon 265 then may perform a second lookup for the file to determine whether the file is in the capacity tier 120, 220 (520). In certain embodiments, the second look up may fail (525) (e.g., if the file does not exist at all in the two-tier storage system 100, 200). In response, the two-tier daemon 265 may insert an entry in the file system of the fast tier 110, 210 for the requested file (530), receive a first acknowledgement from the fast tier 110, 210 that the file was created (535). The two-tier daemon 265 then may open the file from the fast tier 110, 210 (540) and receive a second acknowledgement from the fast tier 110, 210 (545) which is then responded to by the two-tier daemon 265 by acknowledging the application's open request (550).

Figure 6:
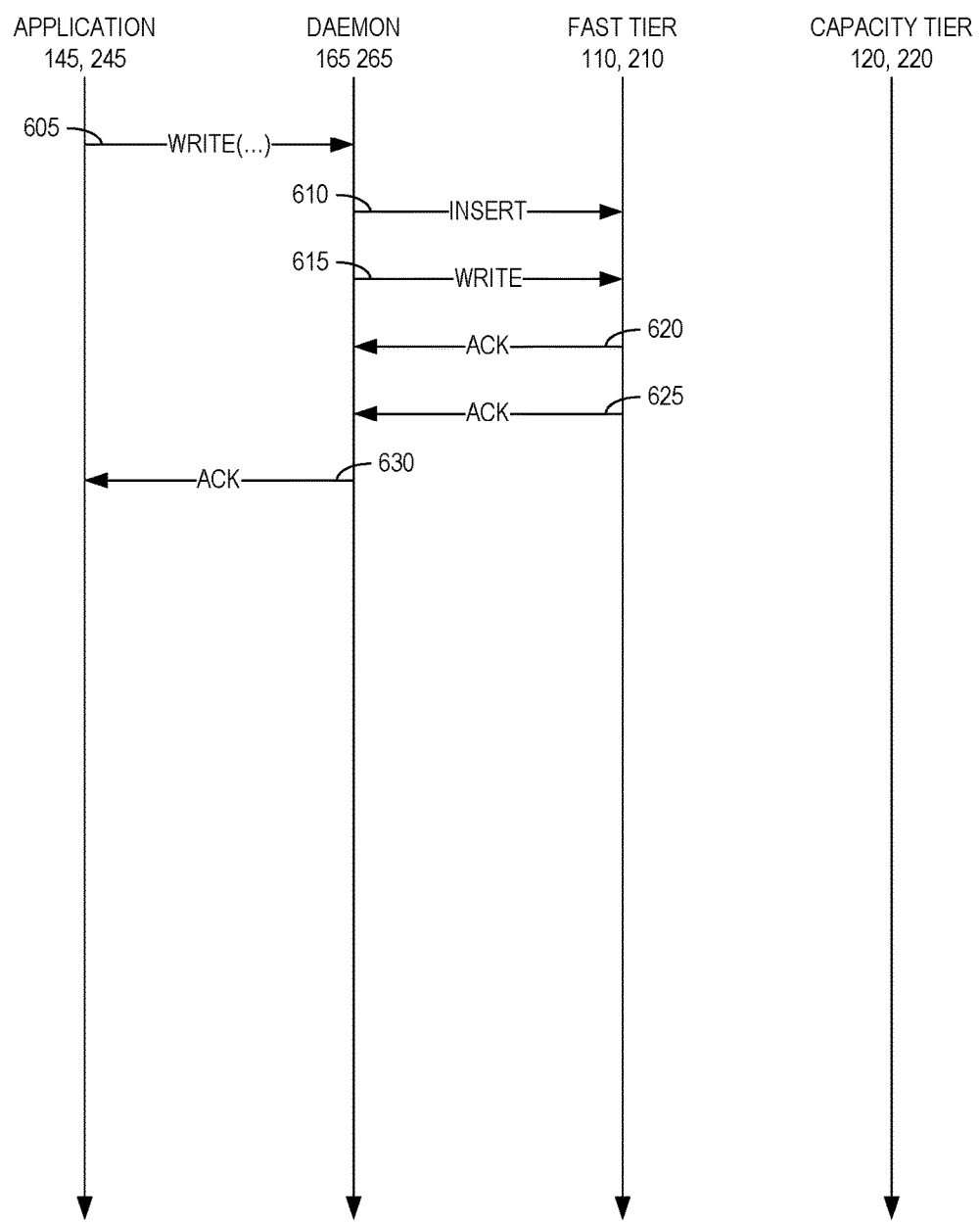
FIG. 6 is a state diagram illustrating a method for writing to a file in a two-tier distributed storage system according to an example embodiment of the present invention.

FIG. 6 is a state diagram illustrating a method for writing to a file in a two-tier distributed storage system 100, 200 according to an example embodiment of the present invention. In certain embodiments, data may only be written through the fast tier 110, 210. As illustrated in FIG. 6, the two-tier daemon 165, 265 may receive a write command from the application 145, 245 (605) and, in response, the two-tier daemon 265 may insert an entry in the file system of the fast tier 110, 210 for the requested file (610) and write the file to the fast tier 110, 210 (615). In response, the two-tier daemon 165, 265 may receive acknowledgements (620, 625) in response to the insert (610) and write (615) operations which, in turn, may be acknowledged to the application (630) indicating that the write command (605) succeeded. As illustrated in FIG. 6, the two-tier daemon 265 may optimistically pipeline the insert (610) and write (615) operations (i.e., not wait for acknowledgement between operations but rather proceed in parallel). As understood in the art, optimistic pipelining relies on a low potential for failure: in the success case, the pipelining is advantageous because the command (e.g., write (605)) via its parallel tasks (e.g., insert (610), write (615)) finishes quicker; in the failure case, pipelining is problematic because there is more to cleanup.

Figure 7:
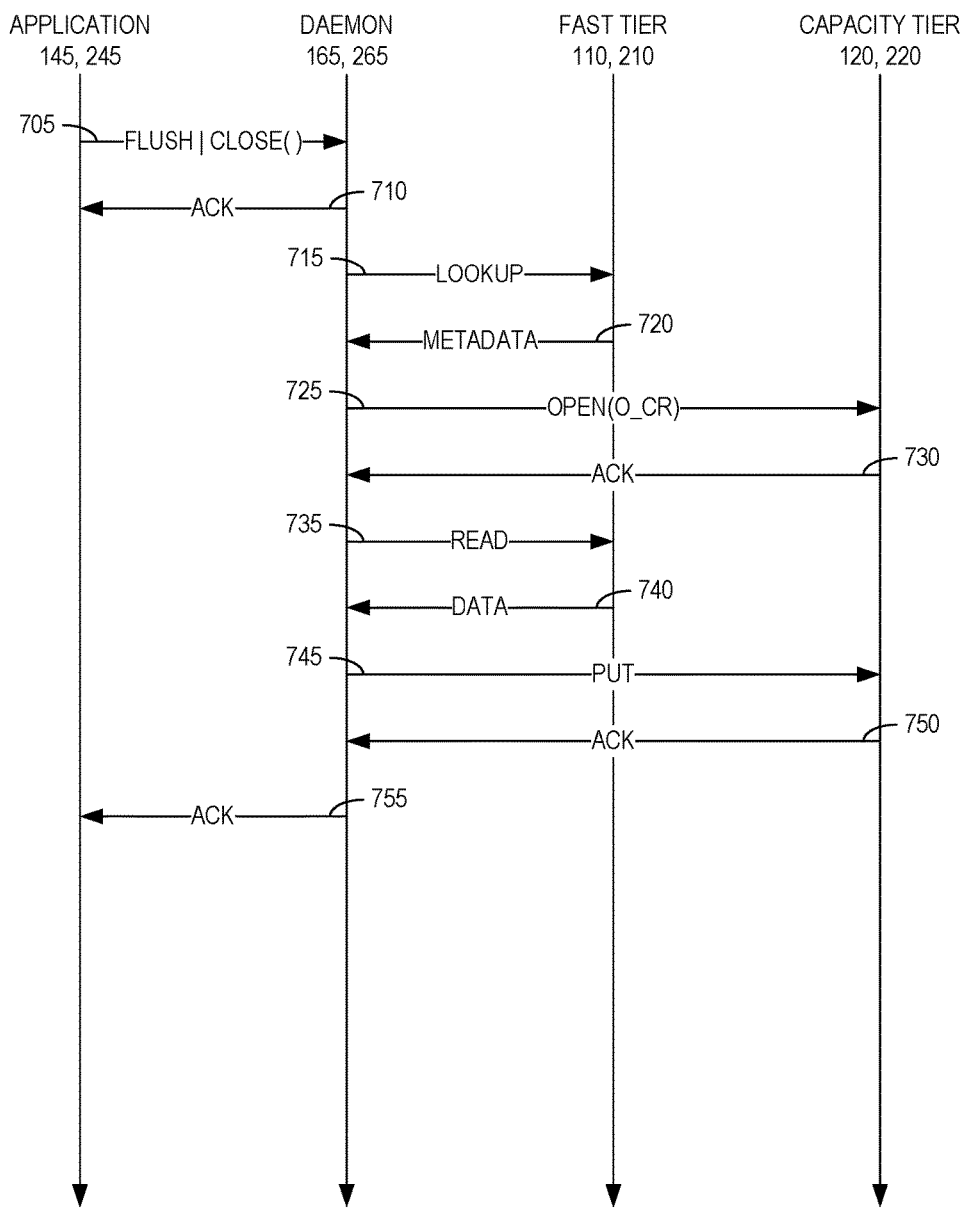
FIG. 7 is a state diagram illustrating a method for flushing dirty data in a two-tier distributed storage system according to an example embodiment of the present invention.

FIG. 7 is a state diagram illustrating a method for flushing dirty data in a two-tier distributed storage system 100, 200 according to an example embodiment of the present invention. According to example embodiments of the present invention, a file is "dirty" when the file has been modified and must be copied back to the capacity tier 120, 220. When a file is in the fast tier 110, 210 and the application 145, 245 modifies it, when the application 145, 245 is done, the modifications need to be saved to the to the capacity tier 120, 220. Conversely, if a file is copied from the capacity tier 120, 220 to the fast tier 110, 210 and not modified, then when the application 145, 245 is done, the file does not need to be copied back to the capacity tier 120, 220. Dirty means that the file has been modified and must be copied back to CT. Clean means it has not been. Dirty and clean are well-known nomenclature to describe compute caches.

As illustrated in FIG. 7, the two-tier daemon 165, 265 may receive a flush/close command from the application 145, 245 (705) and, in response, acknowledge the command (710). Close is important because it signals that the application 145, 245 will not make further modifications to the file and it may be copied to the capacity tier 120, 220; however, without the close, example embodiments of the present invention would have to guess when the application is done modifying the file—if an incorrect guess is made that the application is done and the two-tier daemon 165, 265 starts copying then, when the application 145, 245 does further modifications, that work will be wasted and will require cleanup.

As described above with respect to FIG. 6, the acknowledgement of the flush/close command may be optimistically pipelined, but need not be and, rather, may be acknowledged once the two-tier daemon 165, 265 receives acknowledgement that the tasks have completed (760). The two-tier daemon 165, 265 then may perform a lookup for the dirty data in the fast tier (110, 210) (715) and, in response, receive metadata identifying which files are dirty from the fast tier 110, 210 (720). The two-tier daemon 165, 265 then may create an object in the capacity tier 120, 220 for the dirty data identified by the metadata (725) and receive an acknowledgement from the capacity tier that the object is prepared (730). The two-tier daemon 165, 265 then may perform a read operation on the fast tier 110, 210 (735) and receive the dirty data from the fast tier 110, 210 (740). The two-tier daemon 165, 265 then may put the dirty data into the capacity tier 120, 220 (745) and receive an acknowledgement from the capacity tier 120, 220 (750) and, in response thereto, the two-tier daemon 165, 265 may acknowledge the flush command (705) to the application 145, 245 (755).

Figure 8A:
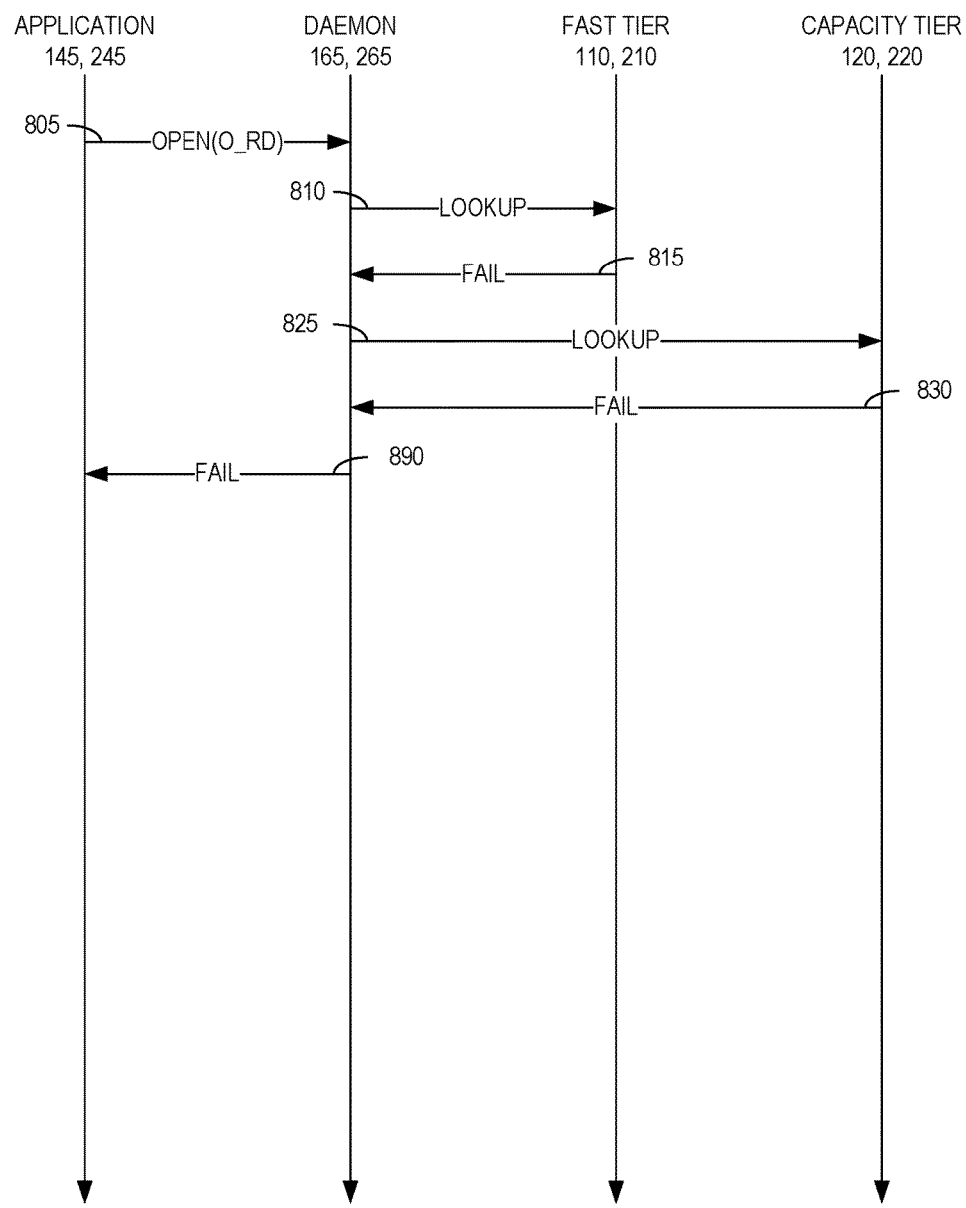
FIGS. 8A-8C are state diagrams illustrating respective method for opening a file in a two-tier distributed storage system according to respective example embodiments of the present invention.
Figure 8B:
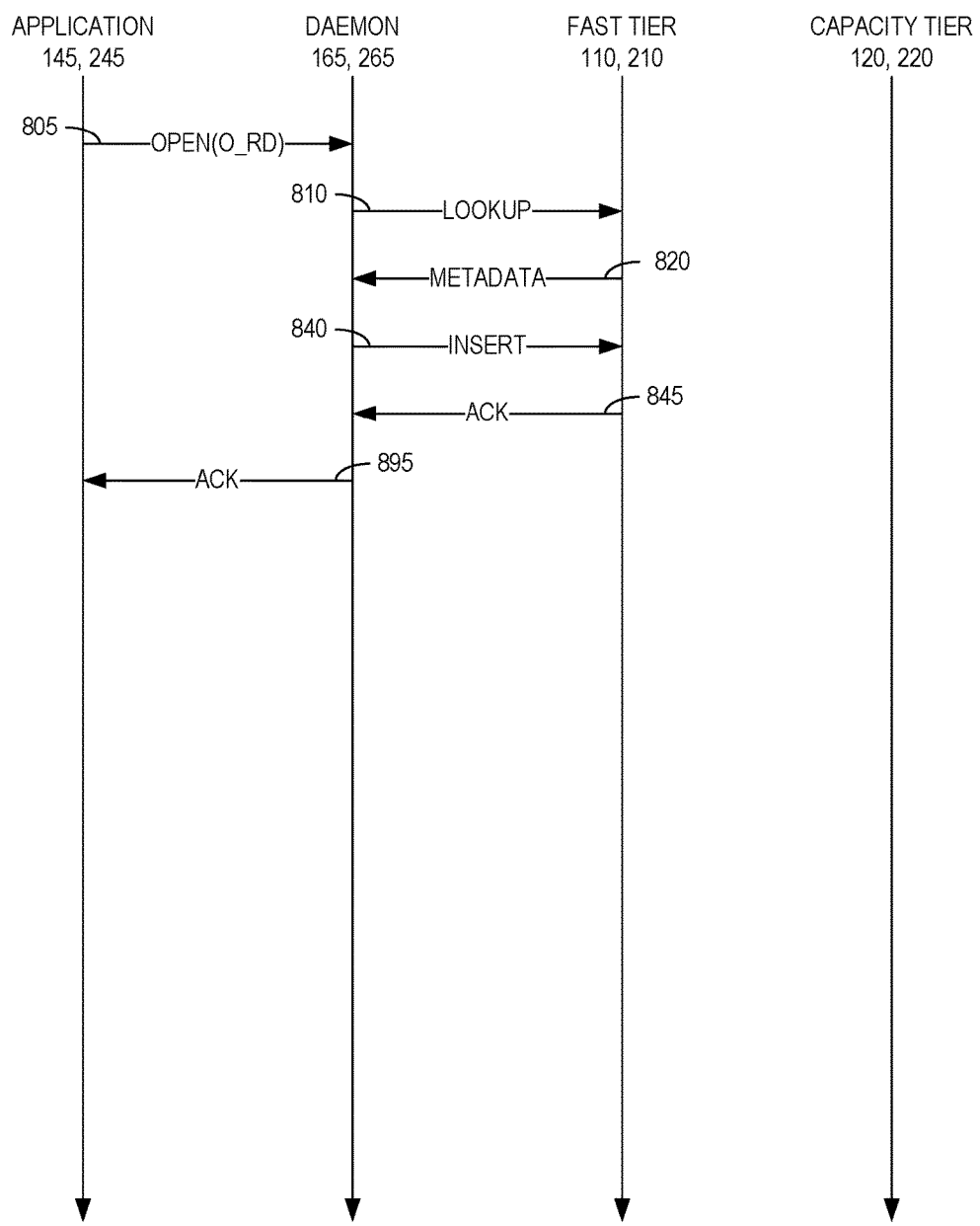
Figure 8C:
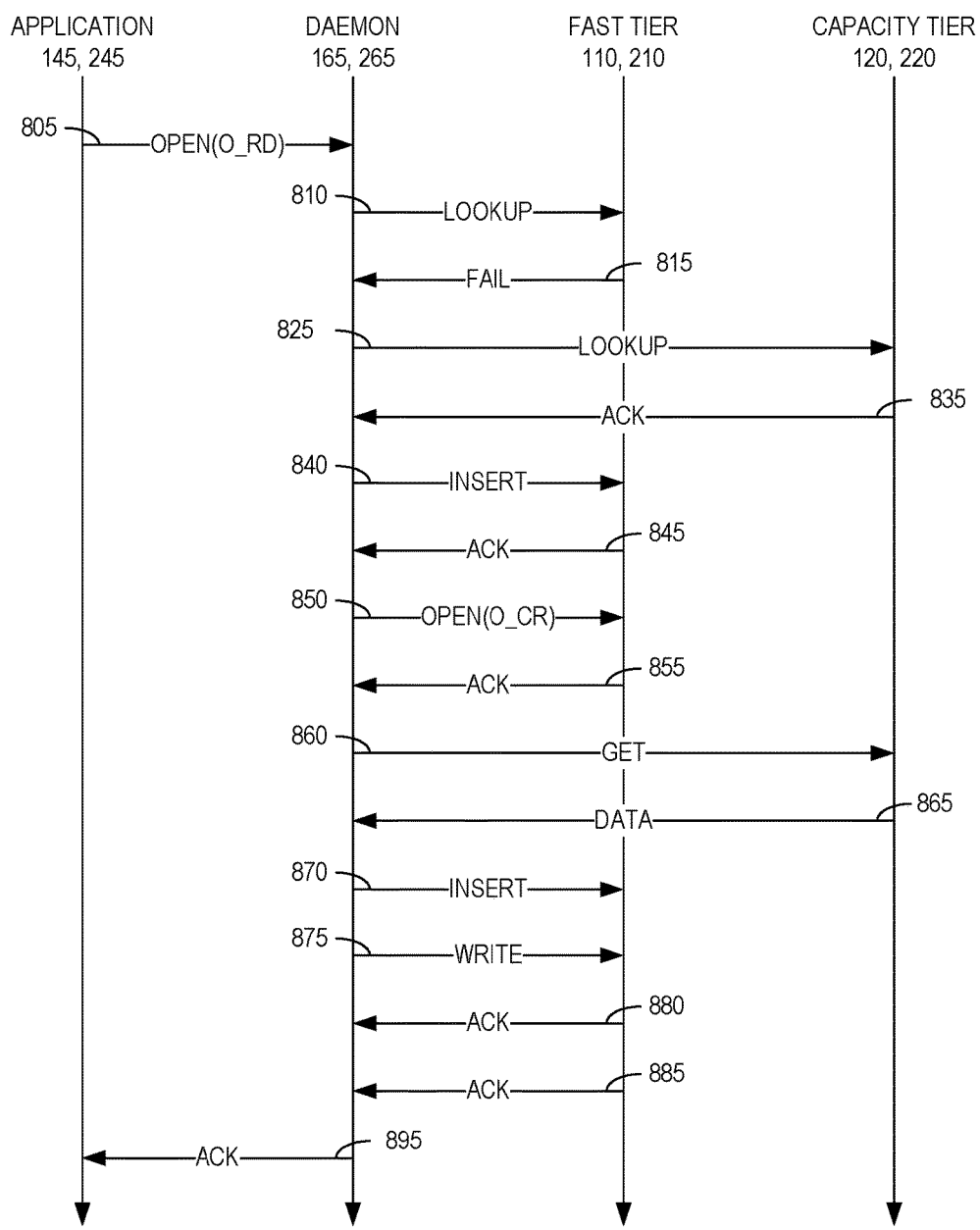

FIGS. 8A-8C are state diagrams illustrating respective method for opening a file in a two-tier distributed storage system 100, 200 according to respective example embodiments of the present invention. In a preferred embodiment, data is accessible for reading directly from either the fast tier 110, 210 or the capacity tier 120, 220. Specifically, this entails that two-tier distributed storage system 100, 200 creates a single vertical dataspace spanning both the fast tier 110, 210 and the capacity tier 120, 220. As illustrated in FIGS. 8A-8C, the application 145, 245 may send an open/read command to the two-tier daemon 165, 265 (805). In response, when an application attempts to acquire a read handle on data, the two-tier daemon 165, 265 may perform a lookup in the fast tier 110, 210 to query its metadata for the key corresponding to the requested data in an attempt to first locate the file in the fast tier 110, 210 (810).

As will be described in greater detail below with respect to FIGS. 8A-8C, this lookup may succeed or fail, with respective methods depending thereon. A metadata lookup failure (i.e., miss) indicates that this data does not exist and the application 145, 245 is informed accordingly. For existing data, the query will return the metadata describing the layout of the data (i.e., which portions of the data reside on which storage nodes 160) (as illustrated in FIG. 3, 310). For data already resident in the fast tier 110, 210, the metadata is returned to the two-tier daemon 165, 265, with subsequent reads by the application 145, 245 being routed appropriately by the two-tier daemon 165, 265.

FIG. 8A is a state diagram illustrating a method for attempting an open operation on a non-existent file in a two-tier distributed storage system 100, 200 according to an example embodiment of the present invention. If the lookup (810) fails (815), the two-tier daemon 165, 265 then may perform a second lookup to determine whether the requested file is stored in the capacity tier 120, 220 (825). If the second lookup fails as well (830), the open/read operation has failed and the two-tier daemon 165, 265 fails the open/read operation to the application 145, 245 (890).

FIG. 8B is a state diagram illustrating a method for performing a read/open operation of a file resident in the fast tier 110, 210 according to an example embodiment of the present invention. If the lookup (810) succeeds, the fast tier 110, 210 returns metadata to the two-tier daemon 165, 265 informing the two-tier daemon 165, 265 about how to access the data in the file (820). The two-tier daemon 165, 265 then may perform an insert operation on the fast tier 110, 210 to indicate that the file is open and put a lock on the file (840). The fast tier 110, 210 then may acknowledge the lock to the two-tier daemon 165, 265 (845) which, in turn, may be acknowledged to the application 145, 245 (895).

FIG. 8C is a state diagram illustrating a method for performing a read/open operation of a file resident in the capacity tier 12, 220 only according to an example embodiment of the present invention. If the lookup (810) fails (815), the two-tier daemon 165, 265 then may perform a second lookup to determine whether the requested file is stored in the capacity tier 120, 220 (825). If the second lookup succeeds and the two-tier daemon 165, 265 receives an acknowledgement from the capacity tier 120, 220 (835), the two-tier daemon 165, 265 may insert metadata into the fast tier 110, 210 to create an entry in the namespace for the file (840), to which the two-tier daemon 165, 265 may receive an acknowledgement thereto (845). The two-tier daemon 165, 265 then may perform an open operation on the fast tier 110, 210 (850) and receive an acknowledgement from the fast tier 110, 210 (855). Optionally, as described above, the two-tier daemon 165, 265 may indicate that the file is open and put a lock on the file. The two-tier daemon 165, 265 then may get the object data for the file from the capacity tier 120, 220 (860) which is then returned from the capacity tier 120, 220 to the two-tier daemon 165, 265 (865). In response, the two-tier daemon 165, 265 may create an entry for the file in the fast tier 110, 210 file system (870) and copy the file data into the file and modify the fast tier metadata to indicate that the file and its data are fast-tier-resident (875). As described above, certain embodiments may optimistically pipeline the insert (870) and write (875) steps and, therefore, receive respective acknowledgements thereto (880), (885) which then may be acknowledged to the application 145, 245 (895).

Reads of data which is not in the fast tier 110, 210 but which is in the capacity tier 120, 220 can be handled in several possible ways. It should be noted that, in this example embodiment, the file read by the application 145, 245 is "promoted" on the open call—that is, the file is moved from the capacity tier 120, 220 to the fast tier 110, 210 when the file is opened by the application 145, 245. In other embodiments, file promotion may be deferred until the first read operation performed by the application 145, 245 which would speed up the open operation (at the expense of the first read operation) but would save work in the rare case that an application 145, 245 opens a file but never actually reads it. The simplest implementation would be to promote all data in the DLN when it is imported. An alternative implementation would be for data to be fetched as needed for each read operation (either a byte range or a time or for the entire file). Finally, in certain embodiments, file promotion from capacity to acceleration is necessary for written files as well because, for files to be directly readable from the capacity tier 120, 220, files stored in the capacity tier 120, 220 are complete objects and the object interface may not allow for partial overwrites, requiring modified files to be written in their entirety when they are copied to the fast tier 110, 210.

Figure 9:
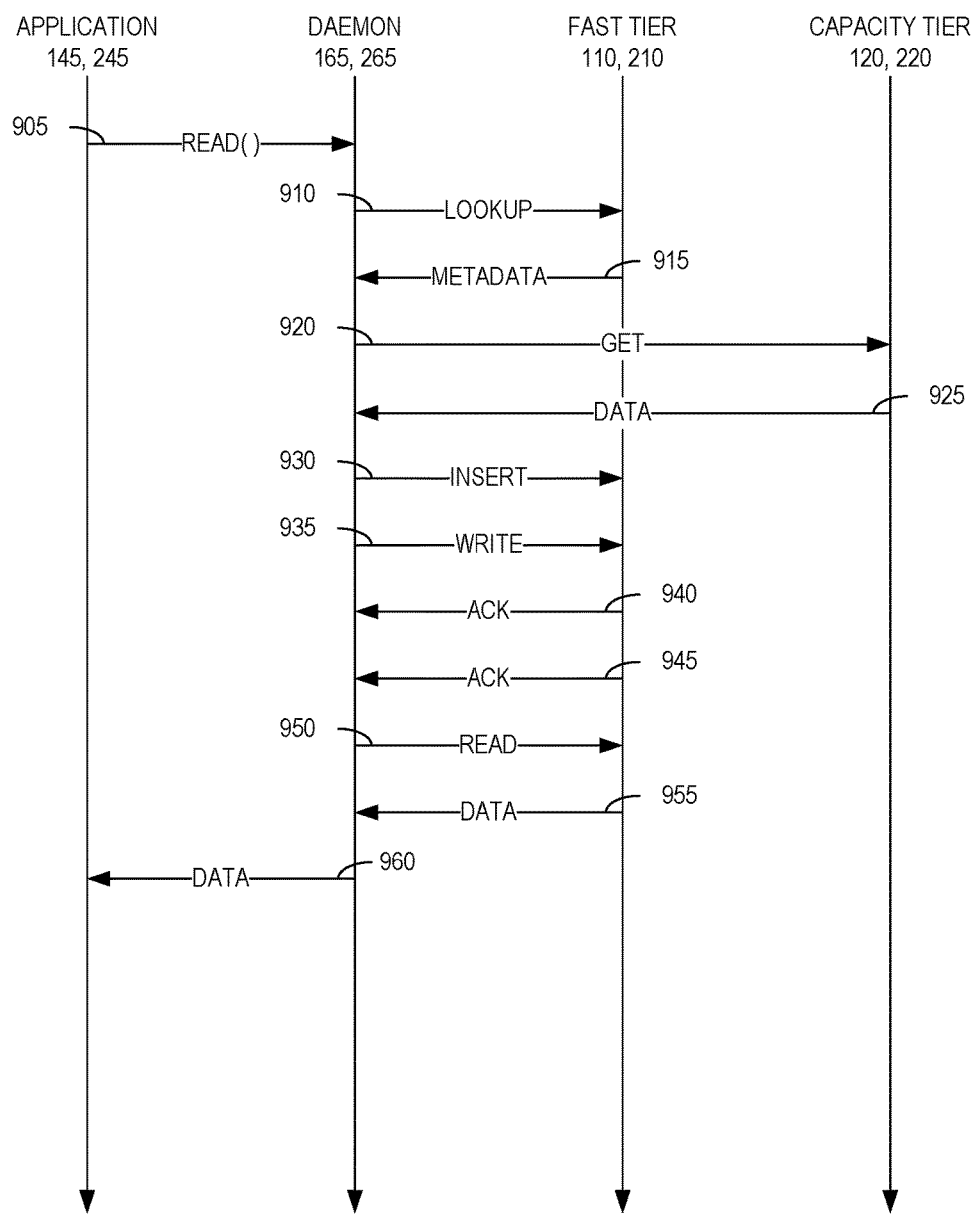
FIG. 9 is a state diagram illustrating a method for reading a file in a two-tier distributed storage system according to an example embodiment of the present invention.

FIG. 9 is a state diagram illustrating a method for reading a file in a two-tier distributed storage system 100, 200 according to an example embodiment of the present invention. As illustrated in FIG. 9, the application 145, 245 may send an open/read command to the two-tier daemon 165, 265 (805). In response, the two-tier daemon 165, 265 may perform a lookup in the fast tier 110, 210 to attempt to first locate the file in the fast tier 110, 210 (810). If the lookup (810) succeeds, the fast tier 110, 210 returns metadata to the two-tier daemon 165, 265 informing the two-tier daemon 165, 265 about how to access the data in the file (915). The two-tier daemon 165, 265 then may get the object data for the file from the capacity tier 120, 220 (920) which is then returned from the capacity tier 120, 220 to the two-tier daemon 165, 265 (925). In response, the two-tier daemon 165, 265 may create an entry for the file in the fast tier 110, 210 file system (930) and copy the file data into the file and modify the fast tier metadata to indicate that the file and its data are fast-tier-resident (935). As described above, certain embodiments may optimistically pipeline the insert (930) and write (935) steps and, therefore, receive respective acknowledgements thereto (940), (945). The two-tier daemon 165, 265 then may perform a read operation on the fast tier 110, 210 (950) and receive the data from the fast tier 110, 210 (955) which, in turn, may be sent to the application 145, 245 in satisfaction of the read operations (960).

Applications reading data directly from the object tier will need first to query the 2T metadata through an API, a CLI, or a web-based query mechanism to receive the mapping from SN to the OID in the CT. Once that mapping has been returned, the application uses the native protocols of the CT to read directly. Remember that writing directly is disallowed in a 2T architecture.

It should be understood that, to ensure that applications 145, 245 can read data directly from the capacity (i.e., object) tier 120, 220 may require a mechanism by which the applications 145, 245 can query the metadata 150, 250 to discover the mapping from the single namespace (SN) to the data in the capacity tier 120, 220 (e.g., the object IDs holding the data). In certain embodiments, data in the distributed storage system 100, 200 may be spread across multiple underlying objects which may be advantageous in that it may improve parallel rates of copying large files from the fast tier 110, 210 to the capacity tier 120, 220. However, this may increase the complexity of subsequent direct reads (as illustrated in FIG. 9) from the capacity tier 120, 220 because each read might require data from a different underlying object. Therefore, to provide the easiest access for existing software (e.g., HDFS workloads reading Isilon files), a two-tier distributed storage system 100, 200 may maintain a simple one-to-one mapping between the namespace and underlying objects.

Figure 10:
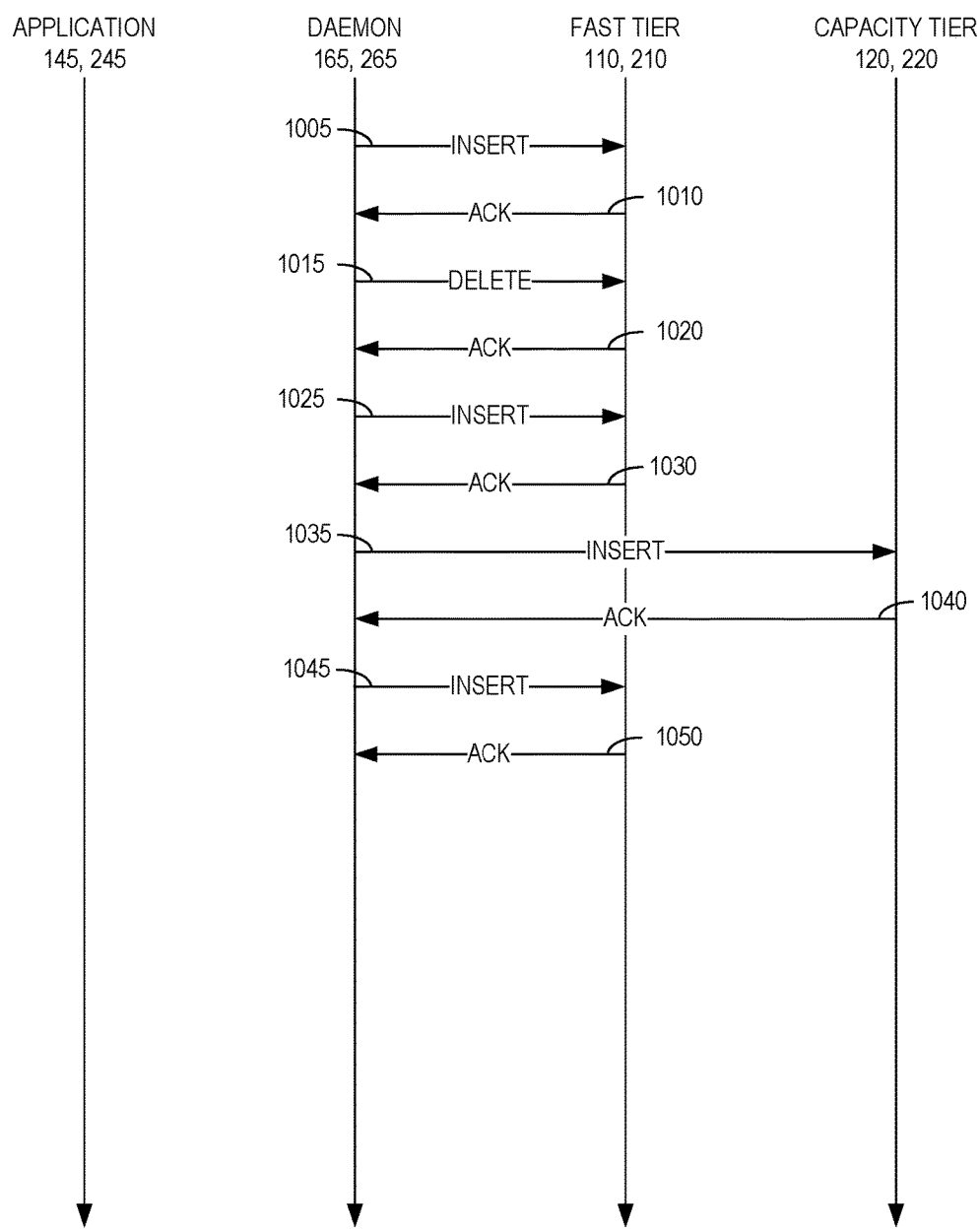
FIG. 10 is a state diagram illustrating a method for freeing fast tier capacity by evicting data in a two-tier distributed storage system according to an example embodiment of the present invention.

FIG. 10 is a state diagram illustrating a method for freeing fast tier 110, 210 capacity by evicting data in a two-tier distributed storage system 100, 200 according to an example embodiment of the present invention. As illustrated in FIG. 10, the two-tier daemon 165, 265 may insert an entry in a write-ahead log as an indicator of a multi-phase operation (1005) and receive an acknowledgement thereto (1010). The two-tier daemon 165, 265 then may delete the file from the fast tier 110, 210 (1015) and receive an acknowledgement thereto (1020). Next, the two-tier daemon 165, 265 inserts the deletion record into the metadata so the deleted file no longer appears in the fast tier 110, 210 namespace (1025), receives an acknowledgement thereto (1030), records the deletion record into the more permanent namespace in the capacity tier 120, 220 (1035), and receives an acknowledgement thereto (1040). Finally, the two-tier daemon 165, 265 records completion of the deletion in the write-ahead log (1045) and receives an acknowledgement thereto (1050).

When transferring data from the fast tier 110, 210 to the capacity tier 120, 220, the two-tier daemon 165, 265 may flatten the data from the file (regardless of its organization on the fast tier 110, 120) to a single object using proper object semantics. This allows for direct reads of the object, results in garbage collection of any stale data in the fast tier 110, 210, and also results in a reduction in the total amount of metadata needed to be stored.

Referring to FIG. 6, in example embodiments of the present invention, when an application 145 creates a new file, the two-tier daemon 165, 265 creates a key-value pair to indicate the existence of this file. A particular data node 160 will be responsible for each file (referred to as the file owner). There are at least several ways to select the file owner. A first approach is a hash of the filename to select the owner, which simplifies the lookup because the data nodes 160 share the hash algorithm so the hash is merely a local calculation. However, for files only written to by a single writer, it will be faster for the data node 160 local to that writer to be the file owner. The drawback of this is that the file-ownership cannot be determined by a simple calculation but rather requires additional metadata to be stored and an additional network metadata query to be made when opening a file to be read. A hybrid approach may also be possible where the default file owner is the data node 160 calculated by the hashing algorithm; in cases where that data node 160 is not actually the owner, it can act as a proxy for the actual owner or redirect to the owner. As data is written to the file, this key-value pair will be updated to reflect the location of the data.

Referring to FIG. 7, when the application 145 finishes writing, as indicated by either a close or a flush operation, the two-tier daemon 165, 265 begins copying the data to the from the fast tier 110, 210 to the capacity tier 120, 220. The two-tier daemon 165, 265 acquires an object ID from the capacity tier 120, 220 and updates the key-value metadata to map the file name to this object ID. After the data has been copied, the metadata is updated once again to indicate that a full and complete replica is now preserved in the capacity tier 120, 220.

Referring to FIG. 10, at this point, a request from the application 145 or from a policy engine (not shown) to free the data from the fast tier 110, 210 can be satisfied. After freeing the data, the two-tier daemon 165, 265 system will update its metadata once again to reflect that the only available copy is on the capacity tier 120, 220.

Figure 11:
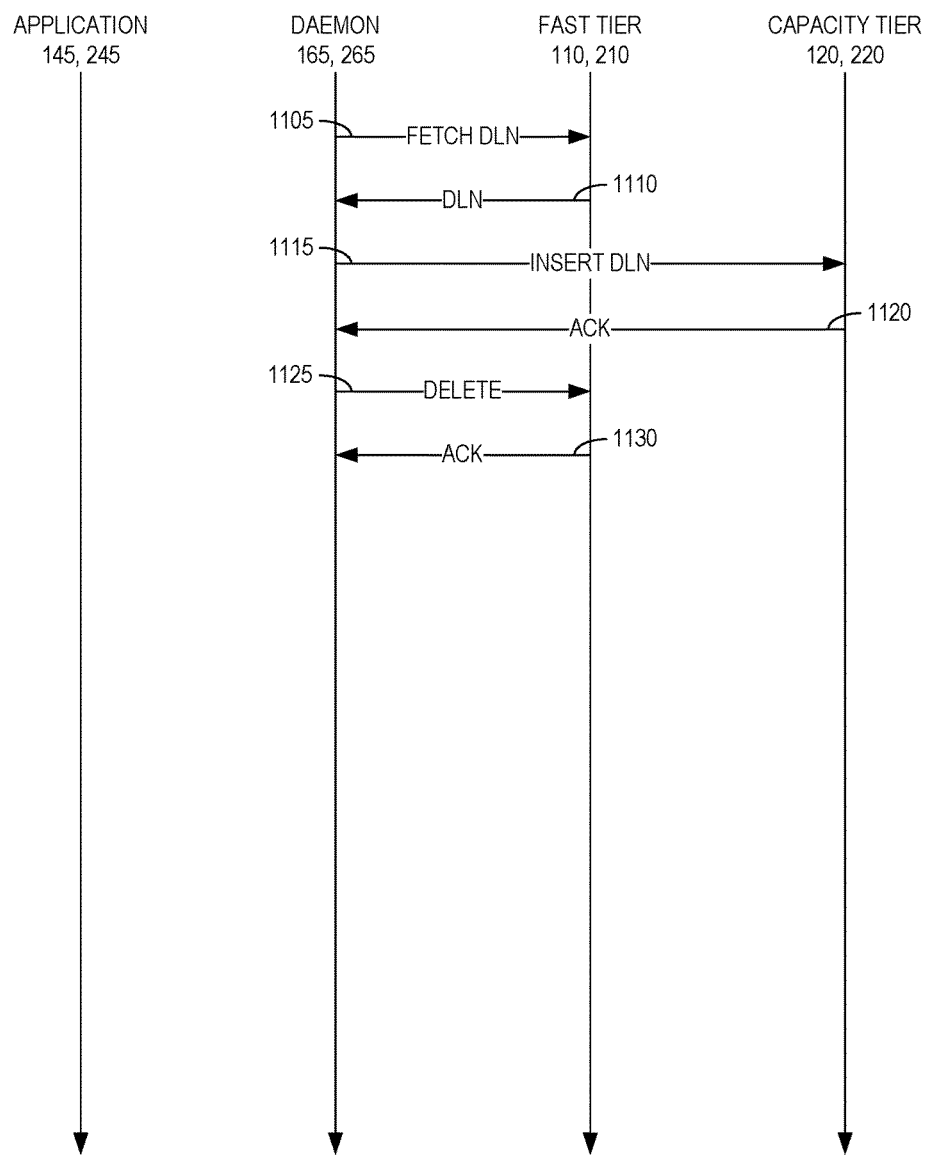
FIG. 11 is a state diagram illustrating a method for freeing fast tier capacity by evicting two-tier metadata in a two-tier distributed storage system according to an example embodiment of the present invention.

FIG. 11 is a state diagram illustrating a method for freeing fast tier 110, 210 capacity by evicting two-tier metadata in a two-tier distributed storage system 100, 200 according to an example embodiment of the present invention. As illustrated in FIG. 11, the two-tier daemon 165, 265 may fetch the DLN from the fast tier 110, 210 (1105) and receive the DLN from the fast tier 110, 210 (1110). The two-tier daemon 165, 265 then may insert the retrieved DLN into the capacity tier 120, 220 as an object (1115) and receive an acknowledgement thereto (1120). In response, the two-tier daemon 165, 265 may delete the DLN from the fast tier 110, 210 (1125) and receive an acknowledgement thereto (1130).

In a preferred embodiment, the two-tier daemon 165, 265 in example embodiments of the present invention avoids having to maintain and enforce file and object permissions but rather reorganizes application I/O and presents a logical namespace which is different from the physical namespace where data and metadata is actually stored. A main function of both is the mapping between the logical and the physical. To ensure correct permissions and security, example embodiments of the present invention use the underlying namespace of the capacity tier 120, 220 to mirror the logical namespace. Then example embodiments of the present invention may set permissions accordingly on the actual physical namespace and attempted operations on it to test whether access for applications was allowed.

Optimized Layout in a Two Tier Storage

In many embodiments, the current disclosure may enable a data storage system to optimize use of one or more file systems within the data storage system to facilitate fast reads and fast writes to the data storage system. In various embodiments, the current disclosure may use a tiered data storage system. In certain embodiments, the current disclosure may enable an administrator to configure a tiered data storage system with a different file system on each tier of the tiered data storage system. In some embodiments, a tiered data storage system may be enabled to change how data may be written based received I/Os from one or more hosts.

In most embodiments, for writing large files, a tiered data storage system may use a log-structured data layout to improve data performance. In various embodiments, for writing small files, a tiered data storage system may use file packing to decrease metadata bottlenecks. In many embodiments, when a tiered data storage system transfers data from a fast tier to a capacity tier, the tiered data storage system may be enabled to write the data to the capacity tier in an optimized way depending on the underlying storage system. In various embodiments, a tiered data storage system may be enabled to provide best read performance by writing wide-striped across data nodes. In certain embodiments, a tiered data storage system may be enabled to provide high read performance by having the data stashed directly with their metadata when possible (i.e., within the i-nodes themselves for filesystems that use i-node structures). In most embodiments, a tiered data storage system may use varied mechanisms for read-layout optimization either directly or indirectly depending on the storage interface exposed by the underlying capacity storage tier. For example, in an embodiment, batch operations may be utilized to create multiple small files simultaneously in a tiered data storage system that support these type of operations, such as, but not limited to, Ceph, DeltaFS, and OrangeFS.

In many embodiments, a write-optimized layout may include use of a write-optimized data structure such as log-structuring in a middleware layer such as Parallel Logged File System (PLFS) or batching namespace modifications in a system such as DeltaFS.

In most embodiments, a tiered data storage may implement both a write-optimized layout for write-intensive application phases and a read-optimized layout for read-intensive application phases. In various embodiments, in a tiered data storage system, implementation of both a write-optimized layout and a read-optimized layout become easier to manage as more knowledge may be known as to whether files may be modified. Specifically, in most embodiments, modifications to files in a tiered data storage system may happen while they are resident in the file system hosted in the fast tier. In various embodiments, a workflow engine may be responsible for running write-intensive phases in the fast tier and read-intensive phases in a separate read-only view. In certain embodiments, a tiered data storage system may implement a write-optimized layout for data in the fast tier and a read-optimized layout for data in the capacity tier. In these embodiments, as data may already be in process of being copied from a fast tier to a capacity tier, conversion of the data while being copied may add little to no additional expense.

Figure 12:
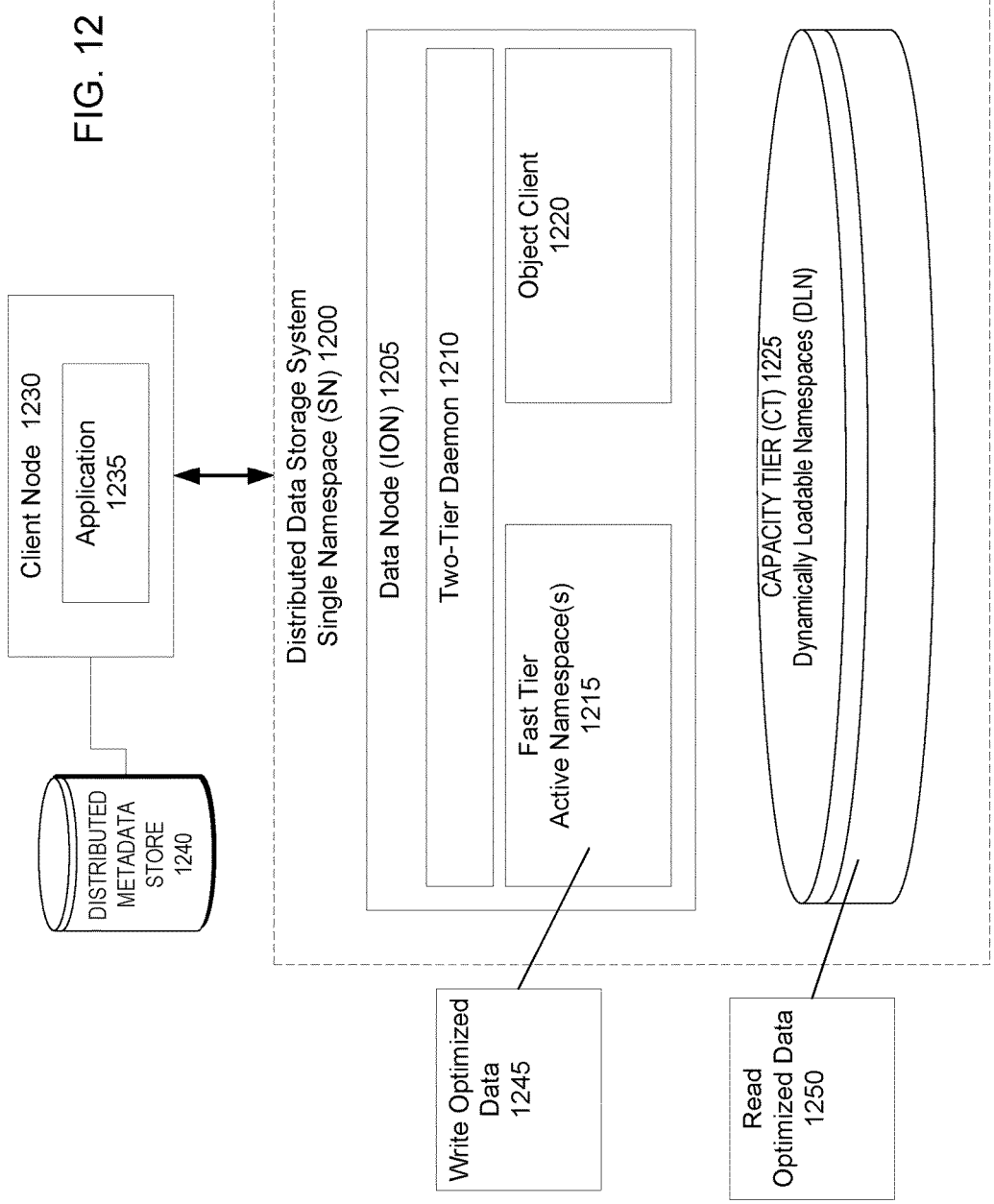
FIG. 12 is a block diagram of a two-tiered distributed storage system 1200 having a single namespace comprised of a plurality of dynamically-loadable namespaces, in accordance with an embodiment of the present disclosure.

Refer to the example embodiment of FIG. 12. FIG. 12 is a block diagram of a two-tiered distributed storage system 1200 having a single namespace comprised of a plurality of dynamically-loadable namespaces, in accordance with an embodiment of the present disclosure. In this embodiment, the distributed system 1200 includes a data node 1205. In many embodiments, the distributed data storage system 1200 may include multiple of data nodes 1205 as is shown in FIG. 2. Each data node 1205 includes a two-tier daemon 1210, an object client 1220, and a fast tier 1215 of data storage. Data node 120 is also in communication with a capacity tier 1225 of data storage accessed via object client 1220. Client node 1230 may rely on distributed metadata storage 1240 to match jobs with dynamically-loadable namespaces.

For example, in an embodiment, when a client node 1230 schedules a job, the job scheduler will have a specific name for the task. This job name may be used as an index into a table stored in the distributed metadata stor1240 to determine an object identifier (OID) of a dynamically-loadable namespace (DLN) to be loaded into the fast tier 1215 for processing of the job. Inside the OID may be a tree of the namespace for population into the fast tier 1215. When the job is finished, the files in the dynamically-loadable namespace are moved to object, replace the file with an OID.

As shown in FIG. 12, two-tier daemon 1210 is enabled to intercept read and write operations (i.e. I/Os) from application 1235. Daemon 1210 is enabled to store newly written data synchronously into the fast tier 1215 so that client nodes 1230 see low latency, high performance write operations. Daemon 1210 is enabled to optionally asynchronously copy the data from the fast tier 1215 to the disk based storage in the capacity tier (CT) 1225 to free the data from, for example, the flash storage in the performance tier 1215 when additional capacity in the fast tier 1215 is required. Daemon 1210 is enabled to use object client 1220 to move data from fast tier 1215 to capacity tier 1225.

In this embodiment, Daemon 1210 is enabled to manage two different data layouts on available data storage. Daemon 1210 is enabled to write data to fast tier 1215 using a write optimized layout creating write optimized data 1245. Daemon 1210 is enabled to move write optimized data 1245 to capacity tier 1225 using object client 1220. While data is being transferred from fast tier 1215 to capacity tier 1225, daemon 1210 is enabled to modify write optimized data 1245 to be read optimized data 1250. In many embodiments, logged structuring and/or logged file system may be used on the fast tier 1215 to facilitate fast writes to fast tier 1215 and quick acknowledgement and/or response to application 1235.

Figure 13:
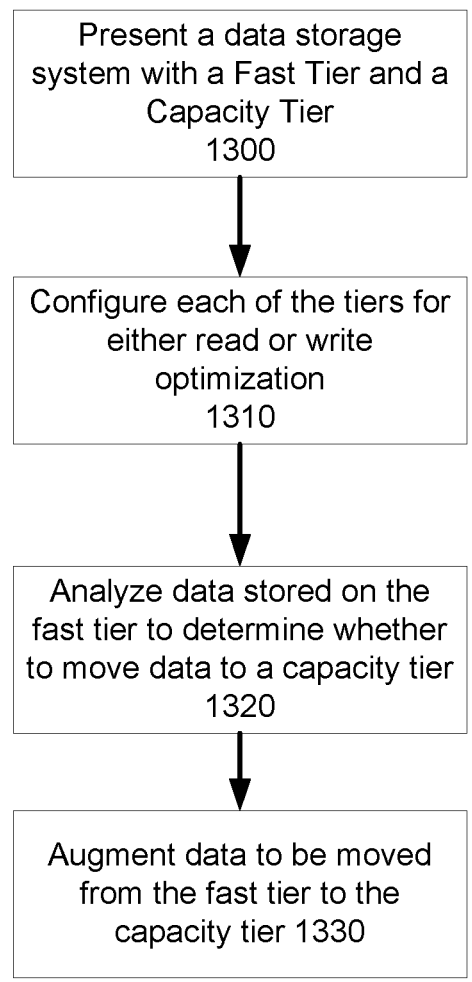
FIG. 13 is a simplified flowchart of managing a two-tiered distributed data storage system as shown in FIG. 12, in accordance with an embodiment of the present disclosure.

Refer to the example embodiment of FIG. 13. FIG. 13 is a simplified flowchart of managing a two-tiered distributed data storage system as shown in FIG. 12, in accordance with an embodiment of the present disclosure. As shown in FIG. 12, distributed data storage system 1200 includes data node 1205 and capacity tier 1225. Data node 1205 includes daemon 1210, fast tier 1215, and object client 1220. Data node 1205 is enabled to communicate with capacity tier 1225 via object client 1220. Distributed data storage system 1200 is presented to client node 1230 (Step 1300). Daemon 1210 within data node 1205 is configured to use a read optimized layout for capacity tier 1225 and a write optimized layout for fast tier 1215 (Step 1310). Daemon 1210 analyzes data stored within fast tier 1215 to determine whether application 1235 has finished modifying write optimized data 1245 (Step 1320). Upon completion, daemon 1210 augments write optimized data 1245 to be read optimized data 1250 and writes read optimized data 1250 to capacity tier 1225 using object client 1220 (Step 1330).

Figure 14:
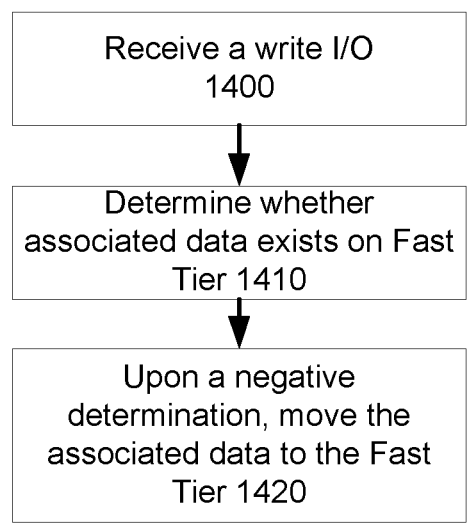
FIG. 14 is an alternate simplified flowchart of managing a two-tiered distributed data storage system as shown in FIG. 12, in accordance with an embodiment of the present disclosure.

Refer to the example embodiment of FIG. 14. FIG. 14 is an alternate simplified flowchart of managing a two-tiered distributed data storage system as shown in FIG. 12, in accordance with an embodiment of the present disclosure. As shown in FIG. 12, distributed data storage system 1200 includes data node 1205 and capacity tier 1225. Data node 1205 includes daemon 1210, fast tier 1215, and object client 1220. Data node 1205 is enabled to communicate with capacity tier 1225 via object client 1220. In this embodiment, application 1235 is executing on client node 1230. Daemon 1210 on data node 1205 receives a write I/O from application 1235 (Step 1400). The write I/O relates to data stored within the distributed data storage system 1200. Daemon 1210 determines whether the data associated with the write I/O exists on fast tier 1215 (Step 1410). Upon a positive determination, Daemon 1210 processes the write I/O on fast tier 1215. Upon a negative determination, Daemon 1210 moves the data associated with the write I/O to the fast tier 1215 (Step 1420). Daemon 1210 converts the layout of the data associated with the write I/O to a write optimized layout created write optimized data 1245.

General

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 15:
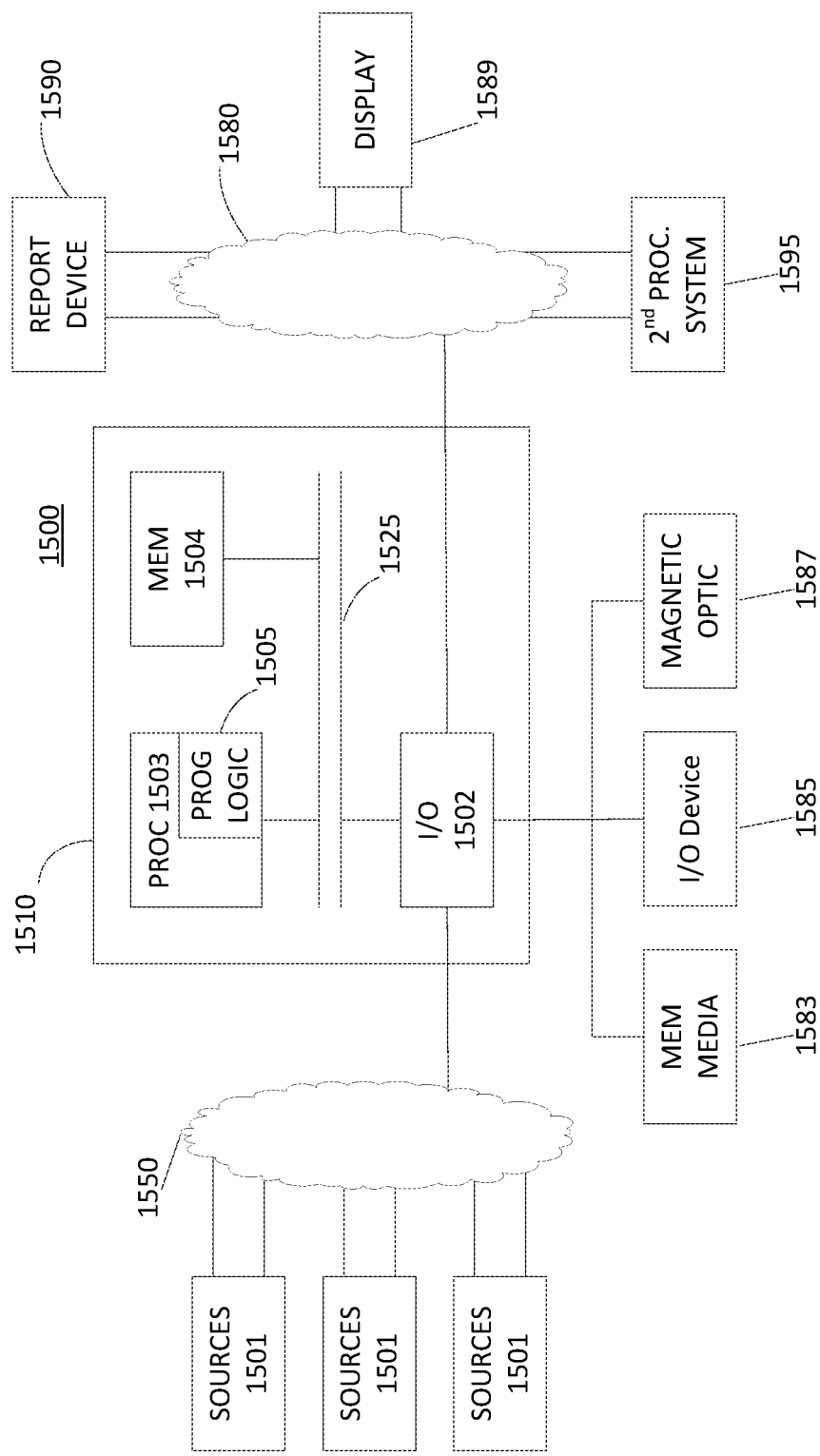
FIG. 15 is an example of an embodiment of an apparatus that may utilize the techniques described herein, in accordance with an embodiment of the present disclosure.

FIG. 15 is a block diagram illustrating an apparatus, such as a computer 1510 in a network 1500, which may utilize the techniques described herein according to an example embodiment of the present invention. The computer 1510 may include one or more I/O ports 1502, a processor 1503, and memory 1504, all of which may be connected by an interconnect 1525, such as a bus. Processor 1503 may include program logic 1505. The I/O port 1502 may provide connectivity to memory media 1583, I/O devices 1585, and drives 1587, such as magnetic drives, optical drives, or Solid State Drives (SSD). When the program code is loaded into memory 1504 and executed by the computer 1510, the machine becomes an apparatus for practicing the invention. When implemented on one or more general-purpose processors 1503, the program code combines with such a processor to provide a unique apparatus that operates analogously to specific logic circuits. As such, a general purpose digital machine can be transformed into a special purpose digital machine.

Figure 16:
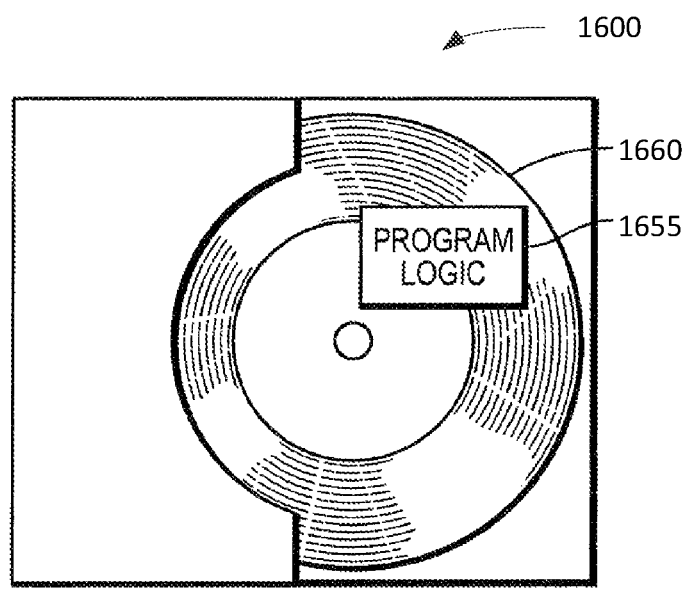
FIG. 16 is an example of a method embodied on a computer readable storage medium that may utilize the techniques described herein, in accordance with an embodiment of the present disclosure.

FIG. 16 is a block diagram illustrating a method embodied on a computer readable storage medium 1660 that may utilize the techniques described herein according to an example embodiment of the present invention. FIG. 16 shows Program Logic 1655 embodied on a computer-readable medium 1660 as shown, and wherein the Logic is encoded in computer-executable code configured for carrying out the methods of this invention and thereby forming a Computer Program Product 1600. Program Logic 1655 may be the same logic 1505 on memory 1504 loaded on processor 1503 in FIG. 15. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-16. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A method comprising:
presenting, to an application, a file system, on a storage system comprising a fast tier of storage and a capacity tier of storage, having a global single namespace (SN) comprising a plurality of dynamically-loadable namespaces (DLNs) maintained in the capacity tier (CT) of object storage of the storage system;
in response to a job submitted by the application, dynamically loading a first dynamically-loadable namespace, including the metadata only for the first dynamically-loadable namespace, associated with the job from the capacity tier of object storage into the fast tier (FT) of storage of the storage system; and
periodically, by the data storage system, reducing metadata by:
determining common characteristics of metadata;
computing representative metadata entries according to the common characteristics; and
storing the representative metadata entries.

2. The method of claim 1 further comprising maintaining a map identifying associations between each dynamically-loadable namespace of the plurality of dynamically-loadable namespaces and an object identifier (OID) identifying the dynamically-loadable namespace in the capacity tier of object storage.

3. The method of claim 1 wherein dynamically loading a first dynamically-loaded namespace associated with the job from the capacity tier of object storage into a fast tier of storage comprises:
fetching the first dynamically-loadable namespace from the capacity tier of object storage;
receiving the first dynamically-loadable namespace from the capacity tier of object storage;
creating an active namespace in the fast tier of storage for the dynamically-loadable namespace; and
inserting the first dynamically-loadable namespace into the fast tier of storage.

4. The method of claim 1 further comprising opening a file for writing comprising:
receiving an open command from the application to write the file to the storage system;
performing a first lookup for the file in the fast tier;
receiving a first response that the first lookup failed;
performing a second lookup for the file in the capacity tier;
receiving a second response that the second lookup failed;
performing an inserting operation into the fast tier;
opening the file from the fast tier; and
acknowledging the open command from the application.

5. The method of claim 1 further comprising writing to a file comprising:
receiving a write command from the application;
performing an inserting operation into the fast tier;
writing the file to the fast tier; and
acknowledging the write command from the application.

6. The method of claim 1 further comprising flushing dirty data comprising:
- receiving a flush command for dirty data from the application;
- acknowledging the flush command prior to performing the flush command on the storage system;
- performing a lookup for the dirty data in the fast tier;
- receiving metadata from the fast tier identifying the dirty data;
- creating an object in the capacity tier for the dirty data;
- storing the dirty data to the object in the capacity tier; and
- receiving an acknowledgement from the fast tier.

7. The method of claim 1 further comprising freeing capacity in the fast tier comprising:
- inserting the dynamically-loaded namespace into the capacity tier as an object; and
- deleting the dynamically-loaded namespace from the fast tier.

8. The method of claim 1 further comprising reading a file comprising:
- receiving an open command from the application;
- performing a first lookup for the file in the fast tier;
- receiving a first response from the fast tier indicating success or failure of the first lookup;
- if the first lookup succeeds because the file is resident in the fast tier in the first dynamically-loaded namespace loaded into the fast tier,
  - receiving metadata from the fast tier identifying the file; and
  - acknowledging the open command from the application;
- if the first lookup fails because the file is not resident in the fast tier in the first dynamically-loaded namespace loaded into the fast tier,
  - performing a second lookup for the file in the capacity tier;
  - receiving a second response from the capacity tier indicating success or failure of the second lookup;
  - if the second lookup succeeds because the file is resident in the capacity tier,
    - retrieving the file from the capacity tier;
    - writing the file to the fast tier; and
    - acknowledging the open command from the application; and
  - if the second lookup fails because the file does not exist in either the fast tier or the capacity tier, failing the open command.

9. The method of claim 1 further comprising reading a file from the capacity tier comprising:
- receiving a read command from the application;
- performing a lookup for the file in the fast tier;
- receiving metadata identifying the file in the capacity tier;
- retrieving the file from the capacity tier;
- loading the file into the fast tier;
- reading the file from the fast tier; and
- returning the file to the application.

10. The method of claim 1 further comprising freeing capacity in the fast tier comprising:
- retrieving the dynamically-loaded namespace from the fast tier;
- inserting the dynamically-loaded namespace into the capacity tier; and
- deleting the dynamically-loaded namespace from the fast tier.

11. A storage system comprising:
- a fast tier of storage;
- a capacity tier of storage; and
- computer program code for performing the operations of:
  - presenting, to an application, a file system, on the storage system, having a global single namespace (SN) comprising a plurality of dynamically-loadable namespaces (DLNs) maintained in the capacity tier (CT) of object storage of the storage system;
  - in response to a job submitted by the application, dynamically loading a first dynamically-loadable namespace, including the metadata only for the first dynamically-loadable namespace, associated with the job from the capacity tier of object storage into the fast tier (FT) of storage of the storage system; and
  - periodically, by the data storage system, reducing metadata by:
    - determining common characteristics of metadata;
    - computing representative metadata entries according to the common characteristics; and
    - storing the representative metadata entries.

12. The system of claim 11 further comprising maintaining a map identifying associations between each dynamically-loadable namespace of the plurality of dynamically-loadable namespaces and an object identifier (OID) identifying the dynamically-loadable namespace in the capacity tier of object storage.

13. The system of claim 11 wherein dynamically loading a first dynamically-loaded namespace associated with the job from the capacity tier of object storage into a fast tier of storage comprises:
- fetching the first dynamically-loadable namespace from the capacity tier of object storage;
- receiving the first dynamically-loadable namespace from the capacity tier of object storage;
- creating an active namespace in the fast tier of storage for the dynamically-loadable namespace; and
- inserting the first dynamically-loadable namespace into the fast tier of storage.

14. The system of claim 11 further comprising opening a file for writing comprising:
- receiving an open command from the application to write the file to the storage system;
- performing a first lookup for the file in the fast tier;
- receiving a first response that the first lookup failed;
- performing a second lookup for the file in the capacity tier;
- receiving a second response that the second lookup failed;
- performing an inserting operation into the fast tier;
- opening the file from the fast tier; and
- acknowledging the open command from the application.

15. The system of claim 11 further comprising writing to a file comprising:
- receiving a write command from the application;
- performing an inserting operation into the fast tier;
- writing the file to the fast tier; and
- acknowledging the write command from the application.

16. The system of claim 11 further comprising flushing dirty data comprising:
- receiving a flush command for dirty data from the application;
- acknowledging the flush command prior to performing the flush command on the storage system;
- performing a lookup for the dirty data in the fast tier;
- receiving metadata from the fast tier identifying the dirty data;
- creating an object in the capacity tier for the dirty data;
- storing the dirty data to the object in the capacity tier; and
- receiving an acknowledgement from the fast tier.

17. The system of claim 11 further comprising freeing capacity in the fast tier comprising:
  inserting the dynamically-loaded namespace into the capacity tier as an object; and
  deleting the dynamically-loaded namespace from the fast tier.

18. The system of claim 11 further comprising reading a file comprising:
  receiving an open command from the application;
  performing a first lookup for the file in the fast tier;
  receiving a first response from the fast tier indicating success or failure of the first lookup;
  if the first lookup succeeds because the file is resident in the fast tier in the first dynamically-loaded namespace loaded into the fast tier,
    receiving metadata from the fast tier identifying the file; and
    acknowledging the open command from the application;
  if the first lookup fails because the file is not resident in the fast tier in the first dynamically-loaded namespace loaded into the fast tier,
    performing a second lookup for the file in the capacity tier;
    receiving a second response from the capacity tier indicating success or failure of the second lookup;
    if the second lookup succeeds because the file is resident in the capacity tier,
      retrieving the file from the capacity tier;
      writing the file to the fast tier; and
      acknowledging the open command from the application; and
    if the second lookup fails because the file does not exist in either the fast tier or the capacity tier, failing the open command.

19. The system of claim 11 further comprising reading a file from the capacity tier comprising:
  receiving a read command from the application;
  performing a lookup for the file in the fast tier;
  receiving metadata identifying the file in the capacity tier;
  retrieving the file from the capacity tier;
  loading the file into the fast tier;
  reading the file from the fast tier; and
  returning the file to the application.

20. The system of claim 11 further comprising freeing capacity in the fast tier comprising:
  retrieving the dynamically-loaded namespace from the fast tier;
  inserting the dynamically-loaded namespace into the capacity tier; and
  deleting the dynamically-loaded namespace from the fast tier.

21. A computer program product including a non-transitory computer readable storage medium having computer program code encoded thereon that when executed on a processor of a computer maintains dynamically loadable namespaces, the computer program code comprising:
  computer program code for presenting, to an application, a file system, on a storage system, having a global single namespace (SN) comprising a plurality of dynamically-loadable namespaces (DLNs) maintained in a capacity tier (CT) of object storage of the storage system;
  computer program code for, in response to a job submitted by the application, dynamically loading a first dynamically-loadable namespace, including the metadata only for the first dynamically-loadable namespace, associated with the job from the capacity tier of object storage into a fast tier (FT) of storage of the storage system; and
  periodically, by the data storage system, reducing metadata by:
    determining common characteristics of metadata;
    computing representative metadata entries according to the common characteristics; and
    storing the representative metadata entries.

* * * * *